US00RE46909E

(19) United States
(12) Reissued Patent
Idomoto et al.

(10) Patent Number: US RE46,909 E
(45) Date of Reissued Patent: Jun. 26, 2018

(54) MANUFACTURING METHOD OF AIRBAG CUSHION, AND THE AIRBAG CUSHION

(71) Applicant: Autoliv Development AB, Vargarda (SE)

(72) Inventors: Takeshi Idomoto, Yokohama (JP); Hiroya Tabushi, Yokohama (JP)

(73) Assignee: AUTOLIV DEVELOPMENT AB, Vargarda (SE)

(21) Appl. No.: 13/845,207

(22) Filed: Mar. 18, 2013

Related U.S. Patent Documents

Reissue of:
(64) Patent No.: 7,909,362
Issued: Mar. 22, 2011
Appl. No.: 12/441,455
PCT Filed: Sep. 11, 2007
PCT No.: PCT/JP2007/067647
§ 371 (c)(1),
(2) Date: Mar. 16, 2009
PCT Pub. No.: WO2008/035589
PCT Pub. Date: Mar. 27, 2008

(30) Foreign Application Priority Data

Sep. 22, 2006 (JP) ..... 2006-257787

(51) Int. Cl.
*B60R 21/16* (2006.01)
*B60R 21/231* (2011.01)
(Continued)

(52) U.S. Cl.
CPC ..... *B60R 21/231* (2013.01); *B60R 21/2338* (2013.01); *B60R 2021/0044* (2013.01);
(Continued)

(58) Field of Classification Search
CPC ..... B60R 21/233; B60R 2021/23308; B60R 21/2338; B60R 2021/23382;
(Continued)

(56) References Cited

U.S. PATENT DOCUMENTS 3,879,057 A * 4/1975 Kawashima et al. . B60R 21/233 280/743.2
5,222,932 A * 6/1993 Fontecchio ..... B60R 21/235 112/441
(Continued)

FOREIGN PATENT DOCUMENTS

CN 1459394 A 12/2003
EP 1364838 A2 11/2003
(Continued)

OTHER PUBLICATIONS

International Search Report for PCT/JP2007/067647, ISA JP, dated Oct. 16, 2007.
(Continued)

*Primary Examiner* — Peter C English
(74) *Attorney, Agent, or Firm* — Stephen T. Olson; Harness, Dickey & Pierce, P.L.C.

(57) ABSTRACT

An airbag cushion is manufactured with a rear fabric panel and two front fabric panels. Each front fabric panel has a projecting tether portion to be sewn to an inner face of the rear fabric panel. The front fabric panels are, firstly, superimposed *on* each other. A [back] *first* end of the projecting tether portion is sewn to a part of a periphery of the front fabric panel, to form a second stitch portion [in a recessed shape]. A [front] *second* end of the tether portion is then sewn to the inner face of the rear fabric panel. A periphery of the rear fabric panel is, in addition, sewn to a periphery of the front fabric panel corresponding to the periphery of the rear fabric panel, to form a third stitch portion.

40 Claims, 16 Drawing Sheets

Amended

(51) Int. Cl.
*B60R 21/2338* (2011.01)
*B60R 21/00* (2006.01)
*B60R 21/235* (2006.01)

(52) U.S. Cl.
CPC ..... *B60R 2021/0048* (2013.01); *B60R 2021/23382* (2013.01); *B60R 2021/23538* (2013.01)

(58) Field of Classification Search
CPC ..... B60R 21/2346; B60R 2021/23538; B60R 21/231; B60R 2021/0044; B60R 2021/0048
See application file for complete search history.

(56) References Cited

U.S. PATENT DOCUMENTS 5,308,113 A * 5/1994 Moriset ..... B60R 21/233 280/743.2
5,464,250 A * 11/1995 Sato ..... B60R 21/233 280/730.1
5,683,109 A * 11/1997 Birman ..... B60R 21/233 280/742
6,022,046 A * 2/2000 Isomura et al. ..... B60R 21/233 280/731
6,361,072 B1 * 3/2002 Barnes ..... B60R 21/233 280/728.1
7,021,657 B2 * 4/2006 Kassman et al. ..... B60R 21/233 280/743.2
7,264,270 B2 * 9/2007 Miyata et al. ..... B60R 21/233 280/730.1
7,360,789 B2 * 4/2008 Bito ..... B60R 21/233 280/729
7,380,822 B2 * 6/2008 Abe ..... 280/743.1
7,455,317 B2 * 11/2008 Bito ..... B60R 21/233 280/732
7,458,605 B2 * 12/2008 Hasebe et al. ..... 280/729
7,461,862 B2 * 12/2008 Hasebe et al. ..... 280/743.2
7,631,894 B2 * 12/2009 Hasebe et al. ..... 280/743.2
7,841,622 B2 * 11/2010 Pausch et al. ..... 280/743.2
8,011,691 B2 * 9/2011 Urushibata et al. ..... B60R 21/2338 280/730.1
2003/0030254 A1 * 2/2003 Hasebe ..... B60R 21/233 280/729
2003/0057691 A1 * 3/2003 Tokita et al. ..... B60R 21/233 280/743.2
2003/0218325 A1 11/2003 Hasebe et al.
2004/0145161 A1 7/2004 Hasebe et al.
2004/0164526 A1 * 8/2004 Hasebe et al. ..... 280/729
2004/0195807 A1 10/2004 Hasebe et al.
2005/0161918 A1 7/2005 Bito
2005/0212275 A1 9/2005 Hasebe
2006/0028009 A1 2/2006 Hasebe et al.
2006/0049618 A1 3/2006 Bito
2006/0103118 A1 5/2006 Hasebe
2006/0237953 A1 * 10/2006 Abe ..... 280/729
2006/0249934 A1 11/2006 Hasebe
2007/0018438 A1 * 1/2007 Hasebe et al. ..... B60R 21/233 280/743.2
2007/0024043 A1 * 2/2007 Abe ..... 280/743.2
2007/0132222 A1 * 6/2007 Thomas et al. ..... B60R 21/2338 280/743.2
2009/0020991 A1 * 1/2009 Abe et al. ..... 280/739
2009/0302587 A1 * 12/2009 Thomas ..... 280/743.2

FOREIGN PATENT DOCUMENTS

EP 1452403 A1 9/2004
EP 1632405 A1 3/2006
JP 2000033842 A 2/2000
JP 2004244005 A 9/2004
JP 2004314933 A 11/2004
JP 2005212508 A 8/2005
JP 2005306358 A 11/2005
JP 2006051884 A 2/2006
JP 2006076561 A 3/2006
JP 2007153290 A 6/2007

OTHER PUBLICATIONS

Office Action regarding Japanese Application No. 2012-287689 dated Nov. 11, 2014. Translation provided by Kohno & Kohno.

* cited by examiner

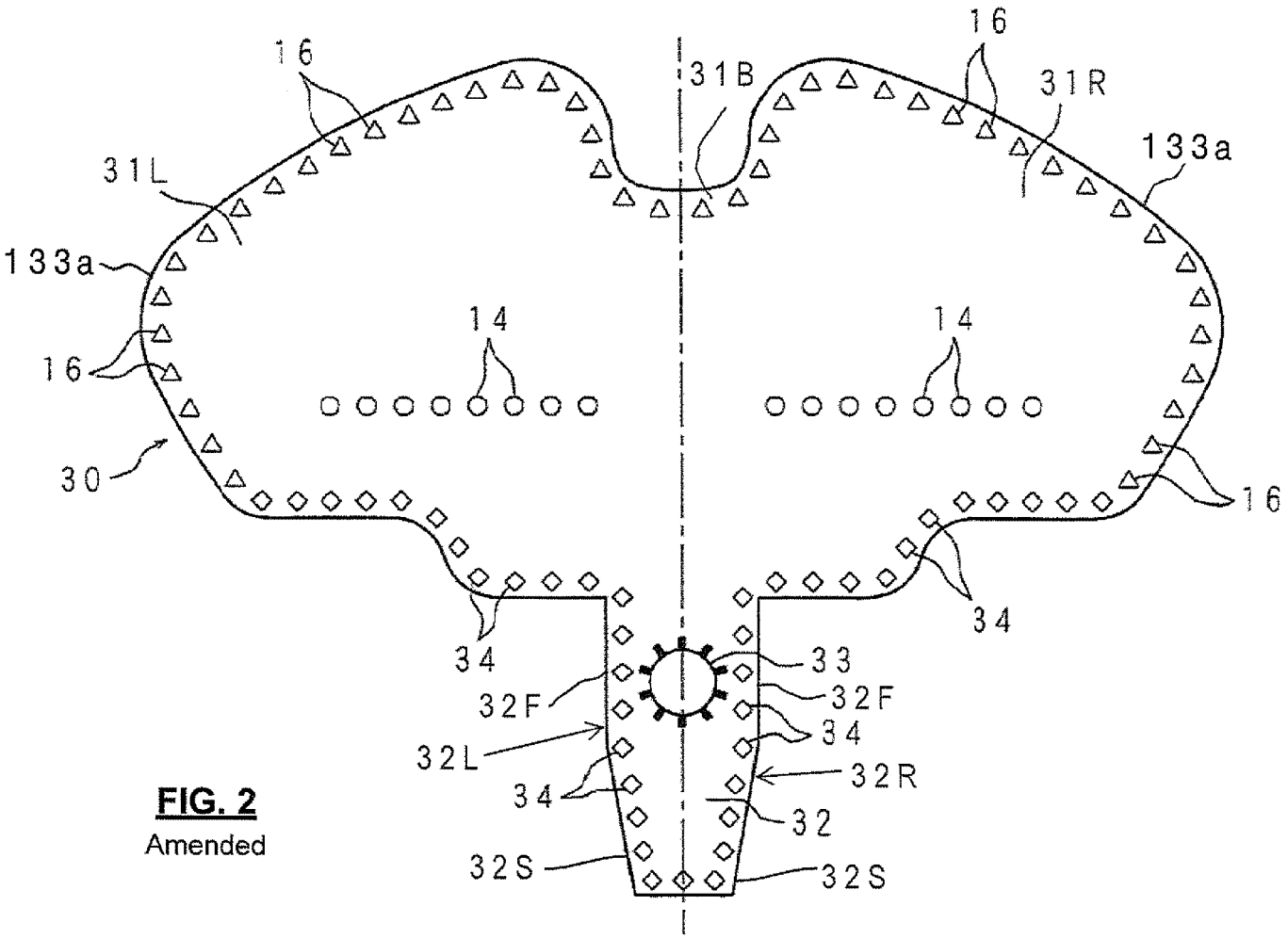
FIG. 2
Amended

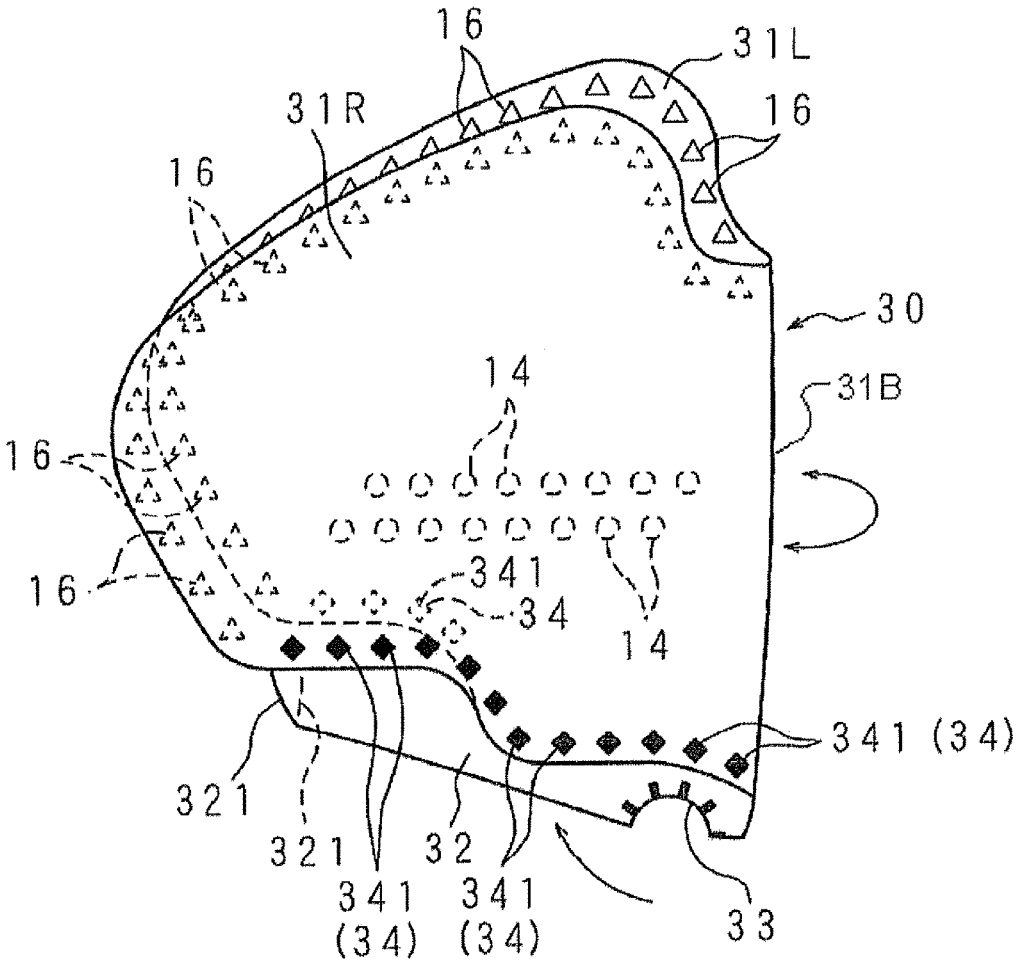
FIG. 4
Amended

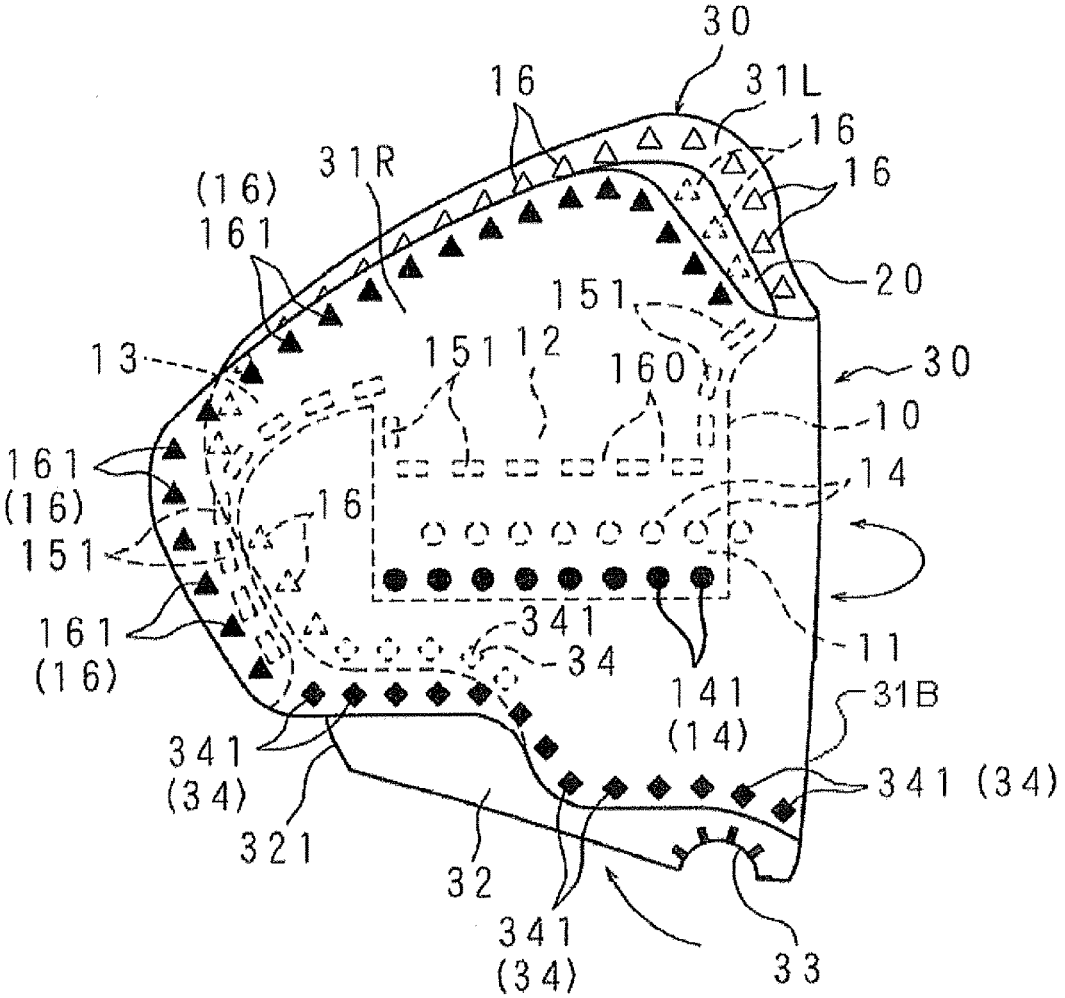
FIG. 5
Amended

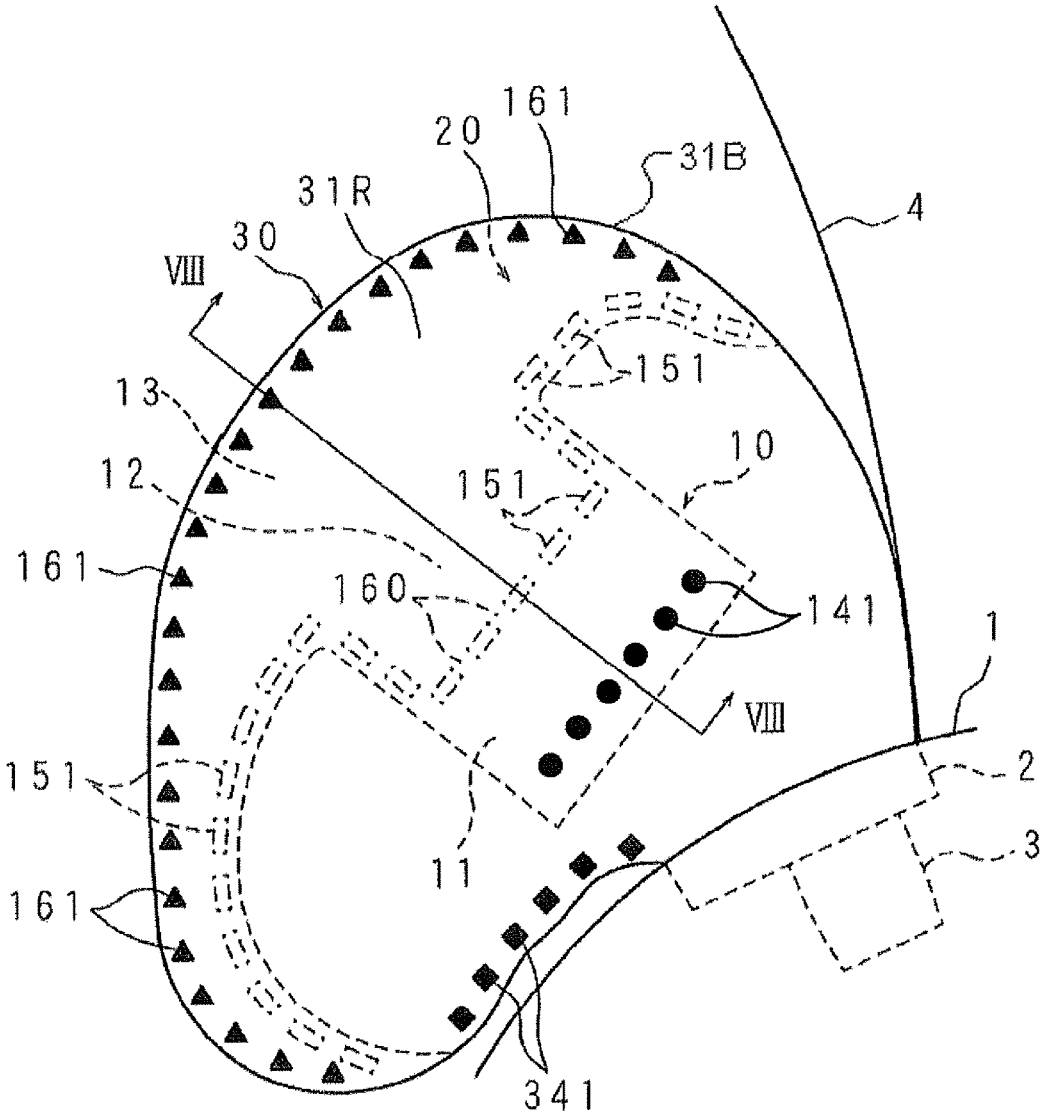
FIG. 6
Amended

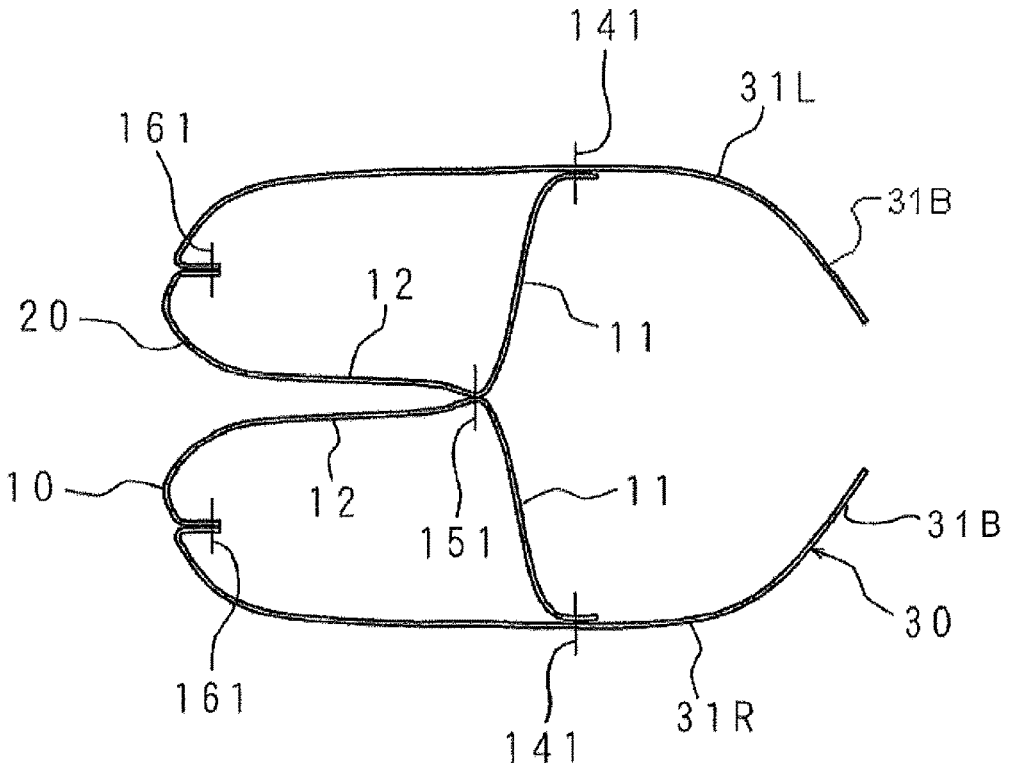
FIG. 8
Amended

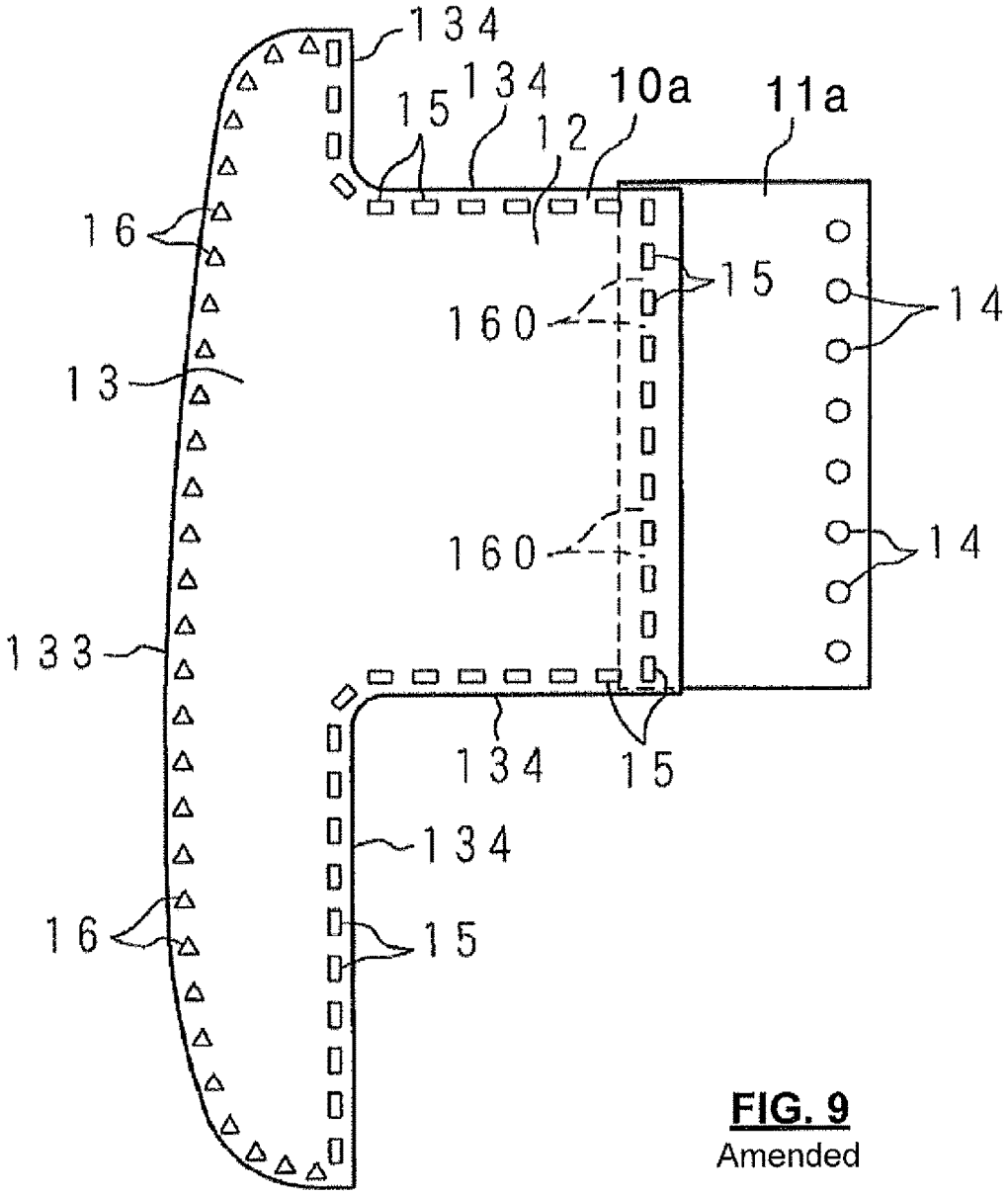
FIG. 9
Amended

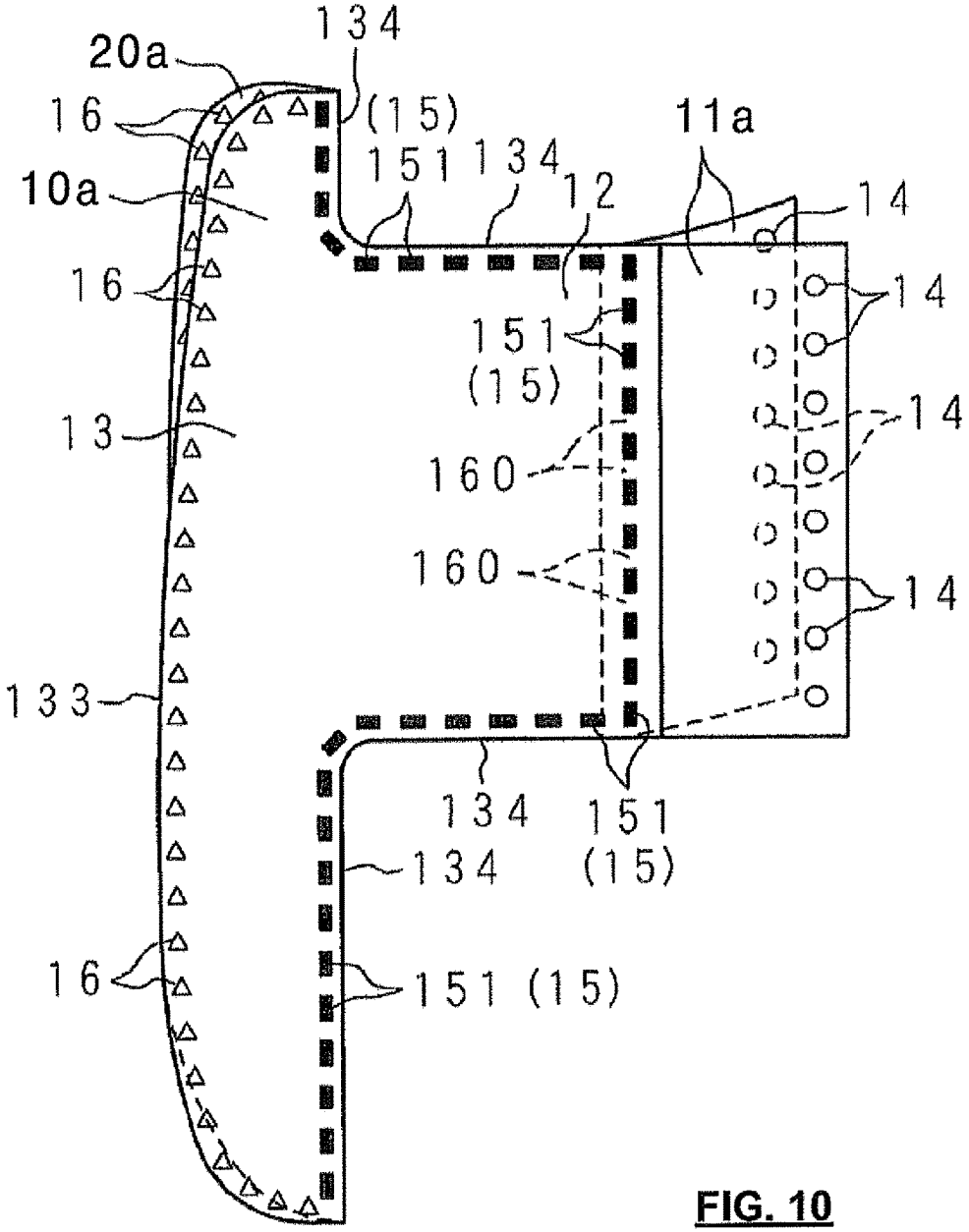
FIG. 10
Amended

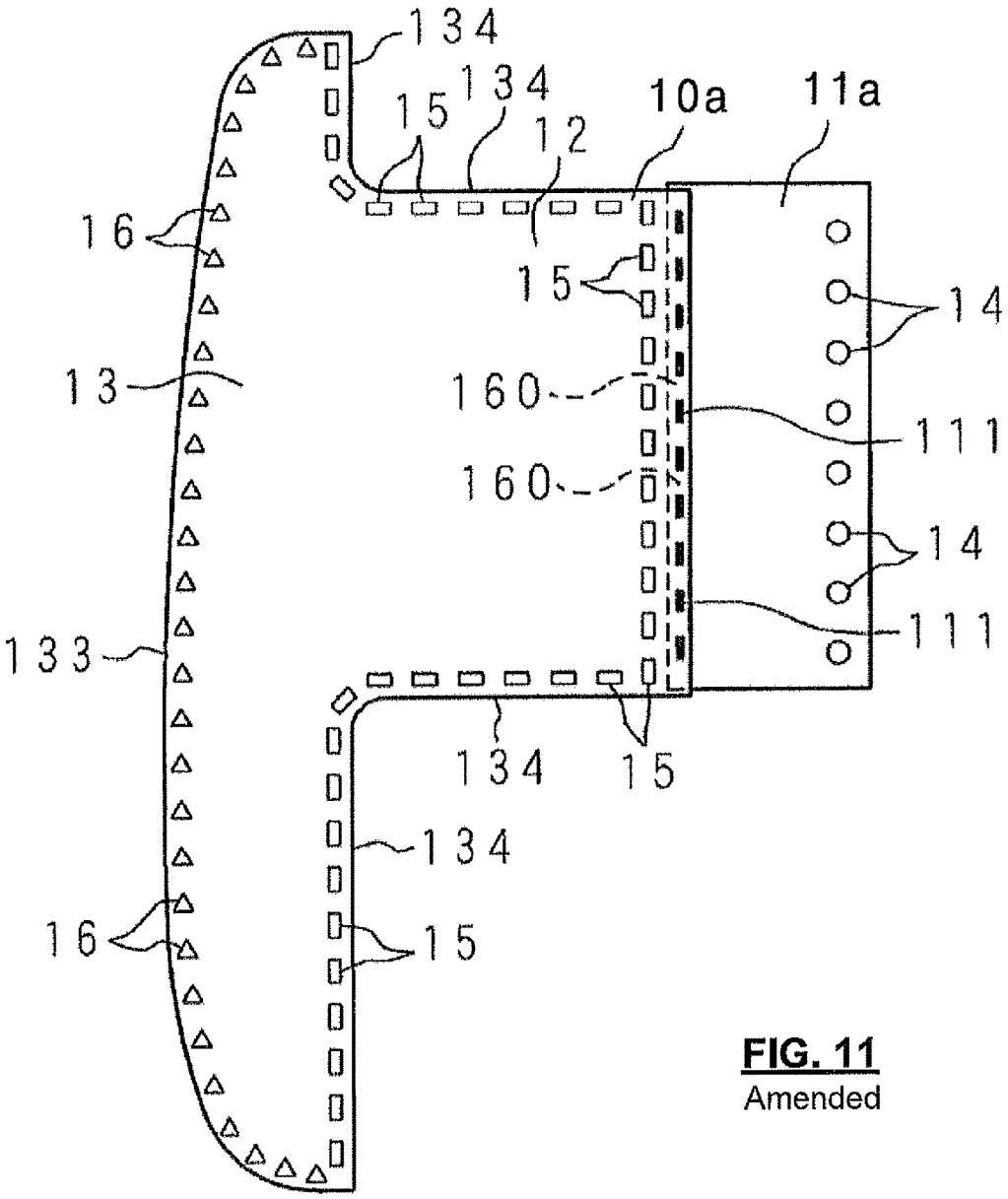
FIG. 11
Amended

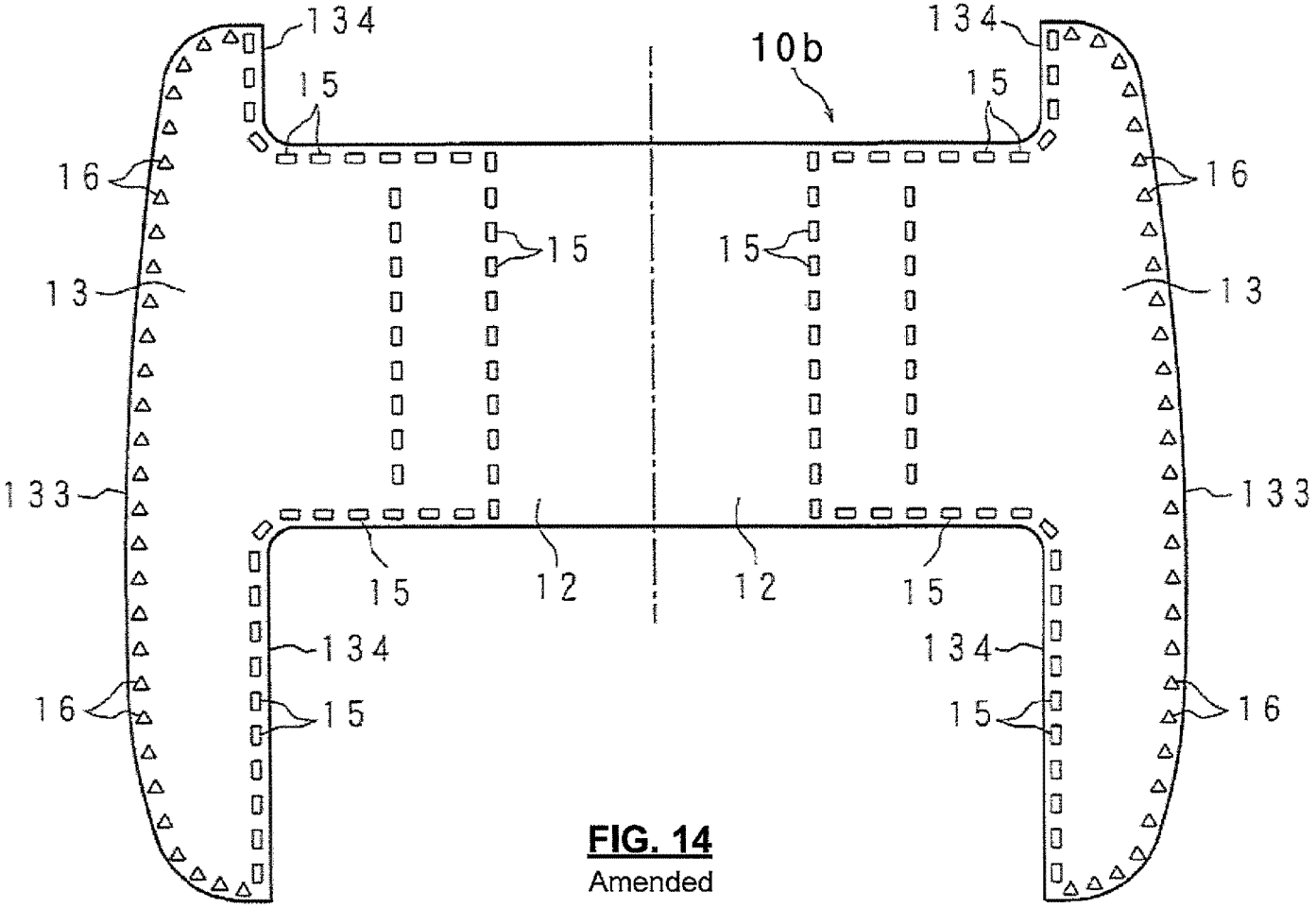
FIG. 14
Amended

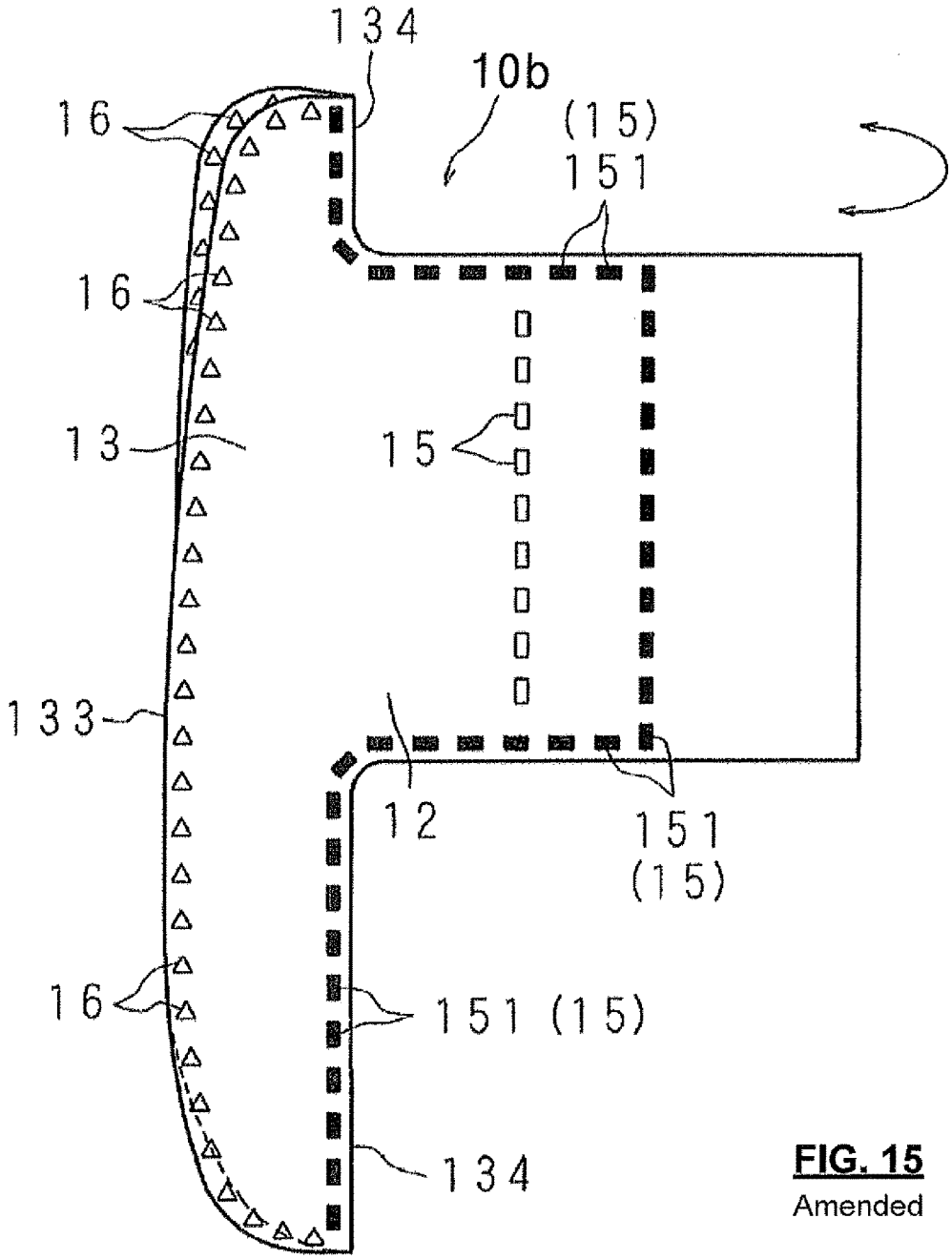
FIG. 15
Amended

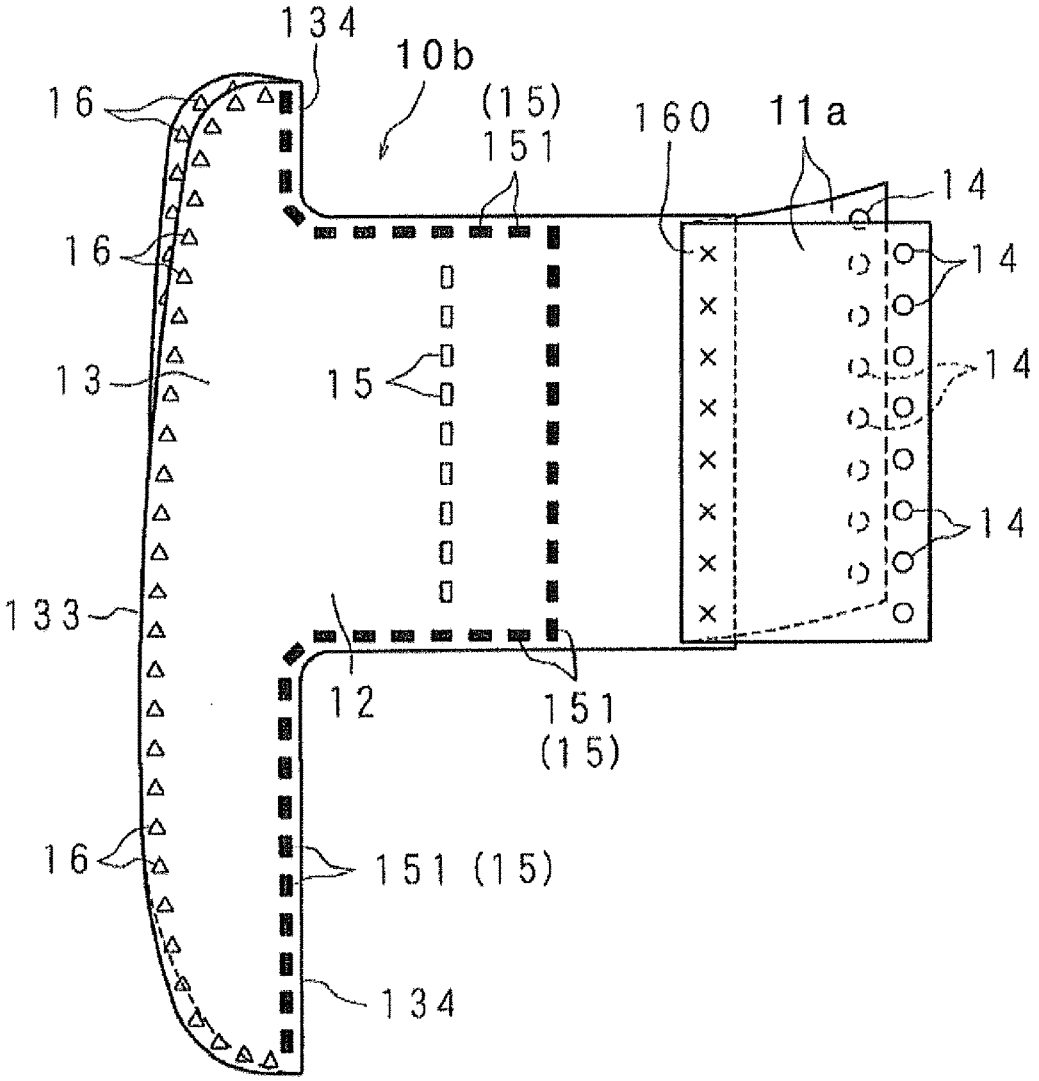
FIG. 16
Amended

MANUFACTURING METHOD OF AIRBAG CUSHION, AND THE AIRBAG CUSHION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

This application *is a reissue application of U.S. application Ser. No. 12/441,455, now U.S. Pat. No. 7,909,362, which* is the national phase under 35 U.S.C. § 371 of PCT International Application No. PCT/JP2007/067647, which has an International filing date of Sep. 11, 2007 and designated the United States of America.

BACKGROUND OF THE INVENTION

1. Field of the Invention

The present invention relates to a manufacturing method of an airbag cushion including a rear fabric panel and two front fabric panels, and to the airbag cushion thereby manufactured.

2. Description of Related Art

An airbag system is well known to be [equipped for] *used in* cars. When detecting an impact of car crash, the airbag system can [injects] *inject* gas generated by an inflator (gas generator) into an airbag cushion. Then, the generated gas inflates and deploys the airbag cushion. Thus, the airbag cushion can absorb the impact of the car crash to protect an occupant of the car, by interposing between the occupant and the car body. Furthermore, the airbag cushion is known to be equipped for a steering wheel or an instrumental panel on an assistant driver side to protect the face and the upper body of the occupants, for securing higher level safety.

Japanese Patent Application Laid-Open No. 2004-244005 discloses a technique of inflating and deploying an airbag cushion into a specific shape, to improve the safety level. The airbag cushion described therein includes a right-side section and a left-side section. In a deployed state, the right-side and left-side sections catch hard costae of [right-side and left-side chests] *the right side of the chest* of the occupant *and the left side of the chest of the occupant*, respectively. In addition, the airbag cushion described therein includes a cavity between the right-side section and the left-side section. In the deployed state, the cavity catches the [sternums] *sternum* located at the center of the chest to absorb the impact.

SUMMARY OF THE INVENTION

The airbag cushion according to Japanese Patent Application Laid-Open No. 2004-244005 requires, however, a large capacity to [to] be enclosed, because the airbag cushion [should be] *is* formed with six fabric panels including two front inner fabric panels, two front outer fabric panels, one rear inner fabric panel and one rear outer fabric panel. Furthermore, the airbag cushion according to Japanese Patent Application Laid-Open No. 2004-244005 needs much effort for sewing those fabric panels.

Moreover, the airbag cushion according to Japanese Patent Application Laid-Open No. 2004-244005 includes strings attached respectively to the front inner fabric panels and strings attached respectively to the front outer fabric panels, to prevent a left side face of the right-side section from moving away from a right side face of the right-side section, and to prevent a left side face of the left-side section from moving away from a right side face of the left-side section, beyond a predetermined distance. Therefore, the airbag cushion according to Japanese Patent Application Laid-Open No. 2004-244005 needs further effort for the manufacture.

The present invention has been accomplished in view of the foregoing situations, with an object to provide an airbag cushion and a manufacturing method of the airbag cushion [that save] *to reduce* the number of fabric panels and have a simpler sewing processing, with a rear fabric panel [and], two front panels [protruding], *and* tether portions [respectively] *protruding from the two front panels*, wherein each tether portion [are] *is* sewn to an inner face of the rear fabric panel, by sewing a [back] *first* end of each tether portion and parts of peripheries of two front fabric panels [in] *together to form* a recessed shape. Furthermore, the object includes a provision of such airbag cushion and such manufacturing method of the airbag cushion that can properly protect a head and a chest of an occupant by the configuration of *the* recessed shape.

In accordance with an aspect of the present invention, a manufacturing method of an airbag cushion having a rear fabric panel and at least two front fabric panels, comprises steps of: superimposing the two front fabric panels *on* each other, *with a tether portion protruding from* each of the front fabric panels [protrudes a tether portion to be sewn to an inner face of the rear fabric panel]; sewing on a [back] *first* end of the protruded tether [portion] *portions* and on parts of peripheries of the front fabric panels[, in] *to form* a recessed shape; sewing a [front] *second* end of the tether [portion] *portions* to [the] *an* inner face of the rear fabric panel; and sewing a periphery of the rear fabric panel to peripheries of the front fabric panels corresponding to the periphery of the rear fabric panel.

In a manufacturing method of an airbag cushion in accordance with an aspect of the present invention, the tether [portion is] *portions are* configured from a part of the front fabric panel.

In a manufacturing method of an airbag cushion in accordance with an aspect of the present invention, one end of each [the] front fabric [panels] *panel* is cut in advance.

In a manufacturing method of an airbag cushion in accordance with an aspect of the present invention, a depth of the recessed shape is [changed] *set* when sewing on the [back] *first* end of the tether portion and on the parts of peripheries of the front fabric panels [in] *to form* a recessed shape.

In accordance with an aspect of the present invention, a manufacturing method of an airbag cushion having a rear fabric panel and at least two front fabric panels, comprises steps of: superimposing the two front fabric panels *on* each other; sewing parts of the front fabric panels to tether portions that are sewn to an inner face of the rear fabric panel; sewing on parts of peripheries of the front fabric panels [in] *to form* a recessed shape; sewing [front] *second* ends of the tether portions to the inner face of the rear fabric panel; and sewing a periphery of the rear fabric panel to peripheries of the front fabric panels corresponding to the periphery of the rear fabric panel.

In accordance with an aspect of the present invention, a manufacturing method of an airbag cushion having a rear fabric panel and at least two front fabric panels, comprises steps of: superimposing the front fabric panels *on* each other; superimposing parts of the front fabric panels on [back] *first* ends of tether portions that are sewn to an inner face of the rear fabric panel; sewing on parts of peripheries of the front fabric panels and on the [back] *first* ends of the tether portions[, in] *to form* a recessed shape; sewing [front] *second* ends of the tether portions to the inner face of the rear fabric panel; and sewing a periphery of the rear fabric panel and peripheries of the front fabric panels corresponding to the periphery of the rear fabric panel.

In accordance with an aspect of the present invention, a manufacturing method of an airbag cushion having a rear fabric panel and a front fabric panel, comprises steps of: folding the front fabric panel to [superimposing] *superimpose portions of* the front fabric panel; sewing on a part of the superimposed front fabric panel [in] *portions to form* a recessed shape; sewing an end of the front fabric panel to a [back] *first* end of *a* tether portion that is sewn to an inner face of the rear fabric panel; sewing a [front] *second* end of the tether portion to the inner face of the rear fabric panel; and sewing a periphery of the rear fabric panel and peripheries of the front fabric panels corresponding to the periphery of the rear fabric panel.

In a manufacturing method of an airbag cushion in accordance with an aspect of the present invention, a depth of the recessed shape is [changed] *set* when sewing on a part of *a* periphery of the front fabric panel [in] *to form* a recessed shape.

In accordance with an aspect of the present invention, an airbag cushion [sewn] *including* a rear fabric panel and at least two front fabric panels, comprises: a peripheral stitch portion where a periphery of the rear fabric panel and each periphery of the front fabric panels corresponding to the periphery of the rear fabric panel are sewn; a recessed stitch portion where the front fabric panels are sewn together [in] *to form* a recessed shape; and a tether portion that projects from the recessed stitch portion or a vicinity of the recessed stitch portion, wherein the tether portion is sewn to an inner face of the rear fabric panel.

In an airbag cushion in accordance with an aspect of the present invention, the tether portion is configured from a part of the front fabric panel, projects from the recessed stitch portion, and is sewn to the inner face of the rear fabric panel; and parts of peripheries of the front fabric panels and a [back] *first* end of the tether portion are sewn [in] *together to form* a recessed shape at the recessed stitch portion.

In an airbag cushion in accordance with an aspect of the present invention, the tether portion is a separate structure from the pair of front fabric panels, projects from the recessed stitch portion or a vicinity of the recessed stitch portion, and is sewn to the inner face of the rear fabric panel; and parts of peripheries of the front fabric panels and a [back] *first* end of the tether portion are sewn [in] *together to form* a recessed shape at the recessed stitch portion.

In an airbag cushion in accordance with an aspect of the present invention, parts of peripheries of the front fabric panels with the exception of the peripheral stitch portion and a [back] *first* end of the tether portion are sewn [in] *together to form* a recessed shape at the recessed stitch portion.

In accordance with an aspect of the present invention, an airbag cushion [sewn] *including* a rear fabric panel and at least two front fabric panels, comprises: a peripheral stitch portion where a periphery of the rear fabric panel and each periphery of the front fabric panels corresponding to the periphery of the rear fabric panel are sewn; a recessed stitch portion where the pair of front fabric panels are sewn together [in] *to form* a recessed shape; and a tether portion whose [back] *first* end is sewn to each of the front fabric panels and whose [front] *second* end is sewn to an inner face of the rear fabric panel.

In accordance with an aspect of the present invention, an airbag cushion [sewn] *including* a rear fabric panel and a front fabric panel, comprises: a recessed stitch portion where the front fabric panel being folded is sewn [in] *to form* a recessed shape; a peripheral stitch portion where a periphery of the rear fabric panel and a periphery of the front fabric panel corresponding to the periphery of the rear fabric panel are sewn; and a tether portion whose [back] *first* end is sewn to an end of the front fabric panel and whose [front] *second* end is sewn to an inner face of the rear fabric panel.

According to the present invention, the airbag cushion includes a rear fabric panel and at least two front fabric panels. Firstly, the recessed stitch portion is formed by superimposing the front fabric panels *on* each other, *with a tether portion protruding from* each of the front fabric panels [protrudes a tether portion to be sewn to an inner face of the rear fabric panel], and by sewing on a [back] *first* end of the protruded tether portion and on a part of a periphery of the front fabric panels[, in] *to form* a recessed shape. The [front] *second* end of the tether portion is then sewn to [the] *an* inner face of the rear fabric panel. In addition, the peripheral stitch portion is formed by sewing a periphery of the rear fabric panel to peripheries of the front fabric panels corresponding to the periphery of the rear fabric panel. Therefore, it is possible to prevent the rear fabric panel from being deployed beyond a predetermined width, because of the tether portion projecting from the pair of the front fabric panels and being sewn to the inner face of the rear fabric panel.

Furthermore, it is possible to properly protect the head or the sternum of the occupant with the use of a space defined by the recessed stitch portion, because the [back] *first* end [portion] *portions* of the projecting tether [portion] *portions* and a part of the periphery of the front fabric panels are sewn [in] *to form* a recessed shape [by] *at* the recessed stitch portion. Moreover, it is possible to properly protect the shoulder and the costae of the occupant because of the front fabric panels that [is] *are* properly inflated and deployed in the left and right direction respectively.

According to the present invention, the airbag cushion includes a rear fabric panel and a front fabric panel. Firstly, the front fabric panel is folded to superimpose *portions of the front fabric panel on each other*, and then the front fabric panel being folded is sewn [in] *to form* a recessed shape. The end of the front fabric panel is sewn to the [back] *first* end of the tether portion. The [front] *second* end of the tether portion is then sewn to the inner face of the rear fabric panel. In addition, a periphery of the rear fabric panel is sewn to a periphery of the front fabric panel corresponding to the periphery of the rear fabric panel.

According to the present invention, it is possible to prevent the rear fabric panel from being inflated and deployed beyond a predetermined width, because of the tether [portion] *portions* projecting from the pair of the front fabric panels. Furthermore, it is possible to properly protect the head or the sternum of the occupant with the use of a space of the recessed stitch portion, because the [back] *first* end [portion] *portions* of the projecting tether [portion] *portions* and parts of the peripheries of the front fabric panels are sewn [in] *to form* a recessed shape [by] *at* the recessed stitch portion. Moreover, it is possible to properly protect the shoulder and the costae of the occupant because of the front fabric panels that are properly inflated and deployed in the left and right direction respectively. In addition, it is possible to improve manufacturing efficiency because of saving the number of panels and sewing processes. It is further possible to [save] *reduce* the *manufacturing* capacity *required* for installing the airbag cushion.

According to the present invention, it is possible to improve manufacturing efficiency and to [save] *reduce* the *manufacturing* capacity *required* for installing the airbag cushion and the like, because of the configuration with one rear fabric panel, one front fabric panel and a tether portion to prevent extra-inflation. Thus, the present invention provides further advantages as described above.

BRIEF DESCRIPTION OF THE DRAWINGS

FIG. 2 is a plan view showing a shape of a rear fabric panel;

FIG. 4 is a schematic perspective view showing the rear fabric panel folded along a folding line;

FIG. 5 is a schematic perspective view showing the [right] rear fabric panel sewn with the front fabric [panel] *panels*;

FIG. 6 is a schematic side view showing an airbag cushion that is equipped in an instrumental panel on an assistant driver side while being inflated and deployed;

FIG. 8 is a schematic cross-sectional view taken along a line VIII-VIII in FIG. 6;

FIG. 9 is a plan view showing a shape of a front fabric panel and a tether portion according to a second embodiment;

FIG. 10 is a plan view showing front fabric panels, tether portions and a state where the front fabric panels and the tether portions are sewn together;

FIG. 11 is a plan view showing a shape of a front fabric panel and a tether portion according to a third embodiment.

FIG. 14 is a plan view showing a shape of a front fabric panel according to a fifth embodiment;

FIG. 15 is a plan view showing a state where the front fabric panel is sewn;

FIG. 16 is a plan view showing a state where the front fabric panel and the tether [portion] *portions* are sewn together;

1 Instrumental Panel
2 Airbag Cushion Case
3 Inflator
4 Front Glass
10 Front Fabric Panel
11 Tether Portion
12 Intermediate Portion
13 Head Portion
14 First Guide Mark
15 Second Guide Mark
16 Third Guide Mark
160 [Back] *First* end *of tether portion*
20 Front Fabric Panel
30 Rear Fabric Panel
31L Left Rear Portion
31R Right Rear Portion
32 Inflator Connection Portion
33 Inflator Inlet
34 Fourth Guide Mark
133 Arc-Shaped Peripheral Portion
134 L-Shaped Peripheral Portion
141 First Stitch Portion
151 Second Stitch Portion (Recessed Stitch Portion)
161 Third Stitch Portion (Peripheral Stitch Portion)
341 Fourth Stitch Portion

DESCRIPTION OF THE PREFERRED EMBODIMENTS

First Embodiment

Figure 1:
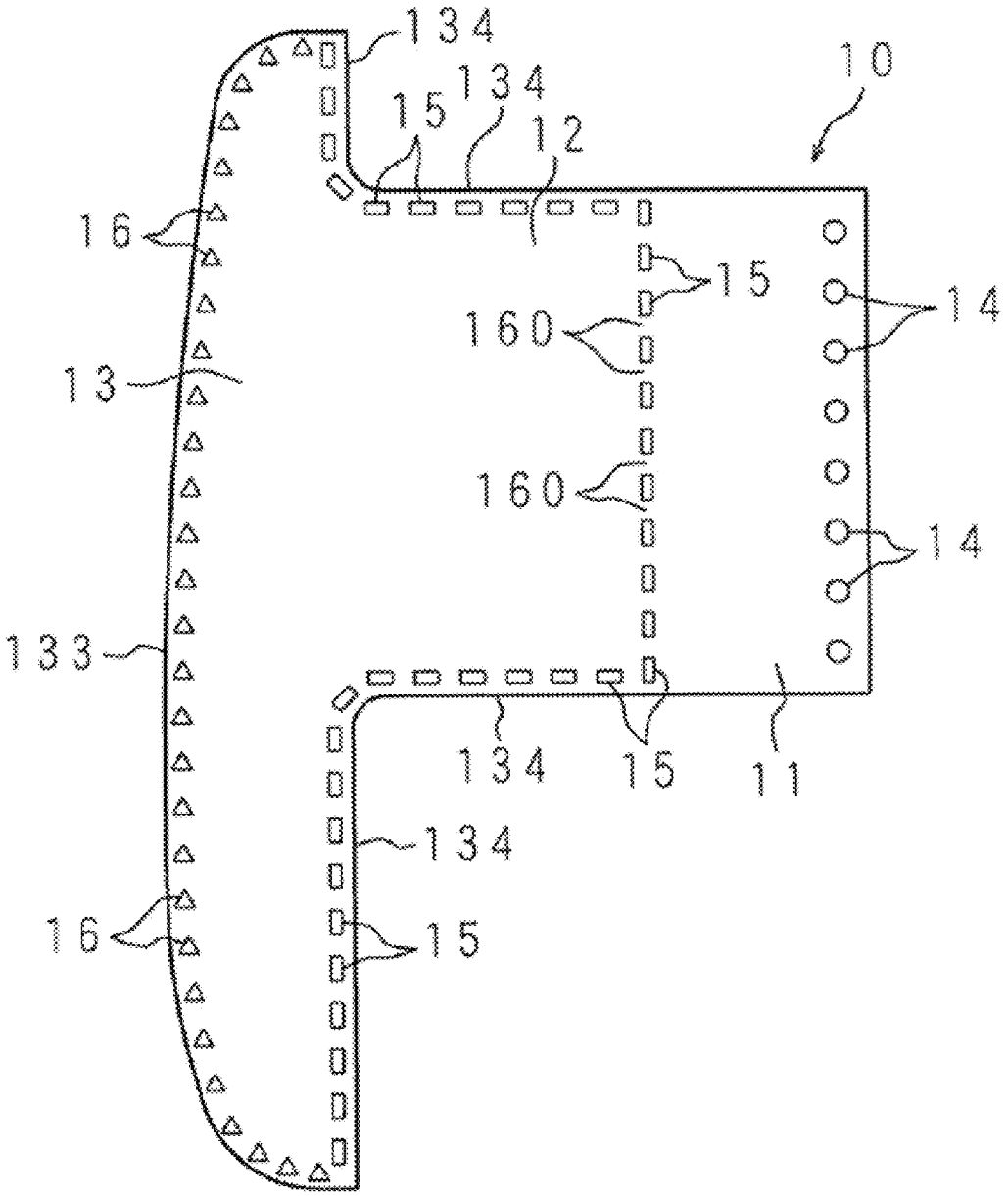
FIG. 1 is a plan view showing a shape of a front fabric panel.
Figure 3:
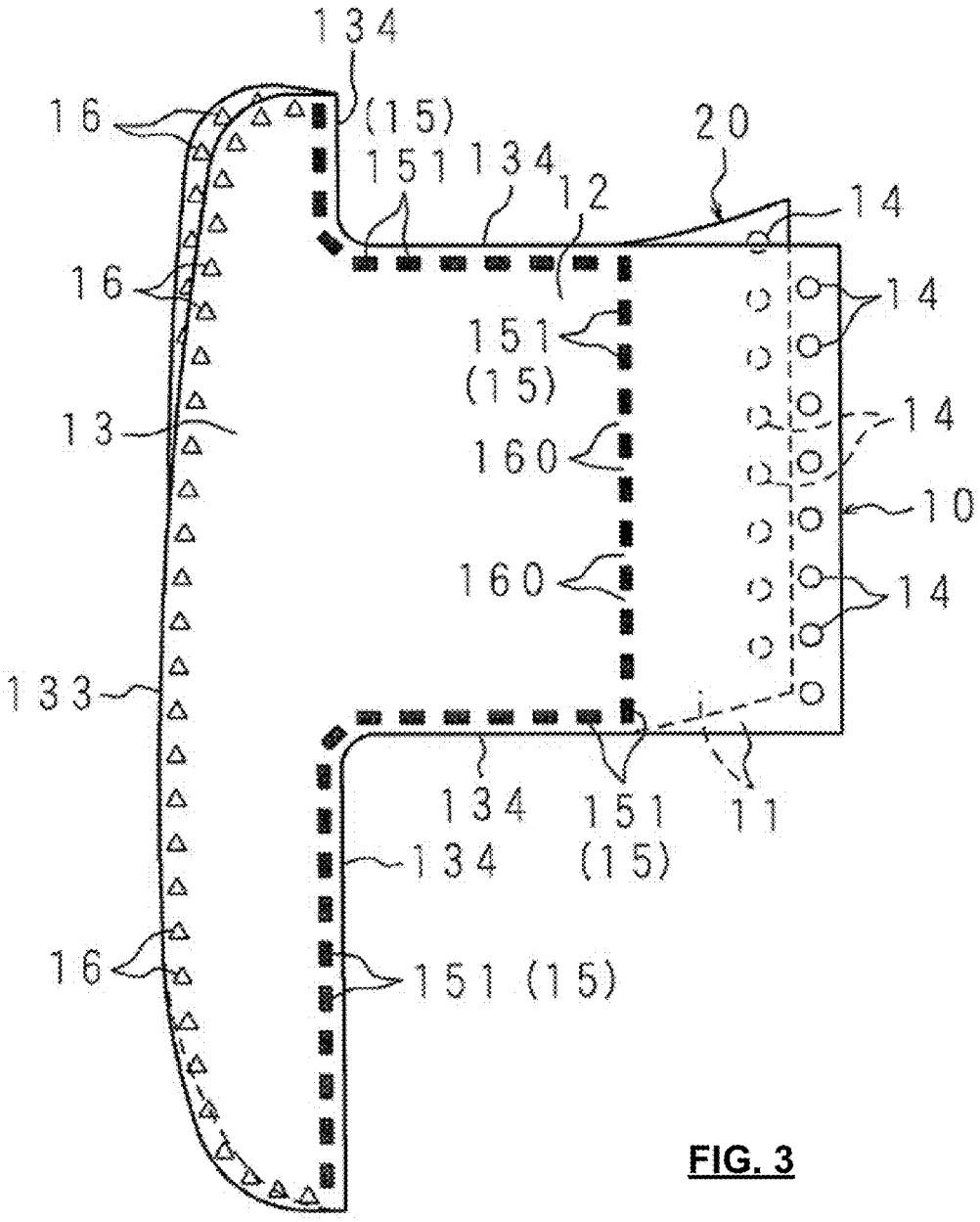
FIG. 3 is a plan view showing a state where two front fabric panels are sewn together.

Hereunder, embodiments of the present invention will be described referring to the drawings. An airbag cushion according to the present invention is manufactured with two front fabric panels and a rear fabric panel. FIG. 1 is a plan view showing a shape of the front fabric panel. In [FIG.] *FIGS.* 1 *and 3*, [a numeral] *numerals* 10 [designates] *and 20 designate* the front fabric [panel] *panels*. The front fabric panel 10 is made from a cloth woven with a nylon fiber, and is cut to make the plan view of the front fabric panel into an ocarina-like shape. The front fabric panel 10 is configured with a head portion 13 that is a substantial semi-elliptic shape, a tether portion 11 that is projecting in an opposite direction to the head portion 13, and an intermediate portion 12 that is a rectangular shape to join the head portion 13 and the tether portion 11. The front fabric panel 10 is formed in a similar shape to the other front fabric panel 20 (Ref. FIG. 3).

The tether portion 11 is a rectangular shape. Further, [the tether portion 11 is longitudinally printed, at the side,] first guide marks 14, 14, . . . [that are] indicated by void circles *are longitudinally printed at the side of the tether portion 11*. As it will be described later, a longer side of the tether portion 11 is sewn to an inner face of the rear fabric panel, to prevent the rear fabric panel from moving away from the front fabric panel 10 beyond a predetermined distance when the airbag cushion is inflated and deployed. The first guide marks 14, 14, . . . are used to sew the tether portion *11* to the inner face of the rear fabric panel in a proper alignment. Further, the tether portion 11 has a [back] *first* end 160 that is linear, at another side opposite to the side [printed] *on which* the first guide marks 14, 14, . . . *are printed*. As it will be described later, second guide marks 15, 15, . . . are printed on the [back] *first* end 160. It should be noted that this embodiment is explained with the printed first guide marks 14, 14, . . . for ease of illustration. [Thus] *However, in various embodiments, the* first guide marks 14, 14, . . . may not be printed [for visualization]. Also, it should be noted that the tether portion 11 may be another suitable shape, although this embodiment is explained with the tether portion 11 of a rectangular shape. For example, the tether portion 11 may be such a trapezoidal shape that the side printed with the first guide marks 14, 14, . . . is shorter than the opposite side formed with the [back] *first* end 160.

The intermediate portion 12 is a rectangular shape, and is joined to the [back] *first* end 160 of the tether portion 11 at the side and to the head portion 13 at other side opposite to the [back] *first* end 160. The joining of intermediate portion 12 to the head portion 13 is at *an* upper position [than] *relative to* a center position of the substantial semi-elliptic-shaped head portion 13. The periphery of the head portion 13 and the intermediate portion 12 is configured from an arc-shaped peripheral portion 133 that is sewn to a periphery of the rear fabric panel and substantial L-shaped peripheral portions 134, 134 where the front fabric panel 10 is sewn to the front fabric panel 20.

The front fabric panel 10 has the second guide marks 15, 15, . . . printed along the L-shaped peripheral portions 134, 134, and the linear [back] *first* end 160, while the second guide marks 15, 15, . . . are used to sew the front fabric panel 10 to the front fabric panel 20 in a proper alignment. Each of the second guide marks 15, 15, . . . , indicated by a panel rectangle, is *used to sew the front fabric panel 10 to the front fabric panel 20 and thereby form the front fabric panels 10, 20 in* a recessed shape in the plan view. A recessed direction of [the] each [second guide mark 15] *of the front fabric panels 10, 20* is the same as a projecting direction of the tether portion 11. Furthermore, the front fabric panel 10 has third guide marks 16, 16, . . . , which are indicated by void triangles, printed along the arc-shaped peripheral portion 133 of the head portion 13.

The third guide marks 16, 16, . . . are used to sew the rear fabric panel to the arc-shaped peripheral portion 133 of the front fabric panel 10 in a proper alignment, while being different from the second guide marks 15, 15, . . . that are used to sew the front fabric panel 10 to the front fabric panel 20 in a proper alignment.

FIG. 2 is a plan view showing a shape of the rear fabric panel. In FIG. 2, a numeral 30 designates the rear fabric panel whose silhouette looks like an elephant with the ears, the nose, and the head. The rear fabric panel 30 is made from a cloth woven with a nylon fiber, as well as the front fabric panel 10. While having a folding line indicated by dash-dot lines at the center, the rear fabric panel 30 includes a left rear portion *or left lateral side* 31L [and], a right rear portion *or right lateral side* 31R, *and a rear or back side 31B, with the left and right rear portions 31L and 31R extending from the back side 31B toward the front fabric panels 20 and 10, respectively*. In addition, the rear fabric panel 30 includes an inflator connection portion 32 projecting downward along the folding line, and is symmetrical with respect to the folding line. The inflator connection portion 32 has *a first longitudinal side 32L, a second longitudinal side 32R, and* an inflator inlet 33 at the upper center. *Each of the first and second longitudinal sides 32L and 32R includes a first side portion 32F that is substantially parallel to the folding line and a second side portion 32S that tapers inward toward the folding line as the inflator connection portion 32 projects from the left and right rear portions 31L and 31R.* The inflator inlet 33 is formed in a circular shape by cutting. Through the inflator inlet 33, gas from a gas generator (not shown) is injected into the airbag cushion when the airbag cushion is deployed.

The rear fabric panel 30 has fourth guide marks 34, 34, . . . , which are indicated by void diamond shapes, printed along a periphery of the inflator connection portion 32 and lower peripheries of the left rear portion 31L and the right rear portion 31R. *As shown in FIG. 2, the lower peripheries of the left and right rear portions 31L and 31R are substantially perpendicular to the folding line.* The fourth guide marks 34, 34, . . . are used to sew one longitudinal side of the inflator connection portion 32 to the lower periphery of the left rear portion 31L and the other longitudinal side of the inflator connection portion 32 to the lower periphery of the right rear portion 31R, in a proper alignment. The fourth guide marks 34, 34, . . . for the one longitudinal side of the inflator connection portion 32 [is] *are* printed symmetrically with respect to other fourth guide marks 34, 34, . . . for the other longitudinal side of the inflator connection portion 32.

An arc-shaped peripheral portion 133*a* of the left rear portion 31L corresponds to the arc-shaped peripheral portion 133 of the front fabric panel 10. The left rear portion 31L has the third guide marks 16, 16, . . . , which are indicated by void triangles, printed along the peripheral portion with exception of the portion where the fourth guide marks 34, 34, . . . are printed. Further, the left rear portion 31L has the first guide marks 14, 14, . . . , which are indicated by the void circles, printed [at] *in a row extending through* the substantial center *or substantial midpoint of the left rear portion 31L* in an orthogonal direction to the folding line. The first guide marks 14, 14, . . . on the inner face of the left rear portion 31L correspond to the first guide marks 14, 14, . . . printed along one side ([front] *second* end) of the projecting tether portion 11 *opposite* from the front fabric panel 10, as shown in FIG. 1. The right rear portion 31R has the first guide marks 14, 14, . . . , the third guide marks 16, 16, . . . and the fourth guide marks 34, 34, . . . that are printed at the symmetrical positions with those on the left rear portion 31L, respectively. It should be noted that this embodiment is explained with the first guide marks 14, 14, . . . , the second guide marks 15, 15, . . . , the third guide marks 16, 16, . . . , and the fourth guide marks 34, 34, . . . printed on the front fabric panels 10, 20 or the rear fabric panel 30, for ease of illustration. As described above, *in various embodiments, the* first guide marks 14, 14, . . . , *the* second guide marks 15, 15, . . . , *the* third guide marks 16, 16, . . . , and *the* fourth guide marks 34, 34, . . . may not be printed [for visualization].

It will be described about the processing to manufacture the airbag cushion with the two front fabric panels 10, 20 and the rear fabric panel 30. Firstly, a processing will be described to sew together the front fabric panels 10, 20. FIG. 3 is a plan view showing a state where the two front fabric panels 10, 20 are sewn together. The front fabric panel 10 is superimposed on the front fabric panel 20 to keep the conformity in positions of the peripheral portions, as the front fabric panel 10 is substantially the same shape as the front fabric panel 20. The front fabric panel 10 and the front fabric panel 20 are then sewn together along the second guide marks 15, 15, . . . , to form second stitch portions (recessed stitch portion) 151, 151, . . . [in a recessed shape] which are indicated by solid rectangles. The second stitch portions 151, 151, . . . are formed along the L-shaped peripheral portions 134, 134, and the linear [back] *first* end 160, as well as the second guide marks 15, 15, . . . , to [make] *form the front fabric panels 10, 20 in* a recessed shape. Therefore, [a space is] *the front fabric panels 10, 20 are* formed in a recessed shape by sewing together the front fabric panel 10 and the front fabric panel 20. It is possible for the space to catch the head or sternum of the occupant when the airbag cushion is inflated and deployed.

Next, another processing will be described to sew the rear fabric panel 30. FIG. 4 is a schematic perspective view showing the rear fabric panel 30 folded along the folding line. The rear fabric panel 30 shown in FIG. 2 is folded along the folding line in a direction from the sheet face toward the viewer about the folding line, to superimpose the right rear portion 31R on the left rear portion 31L. The inflator connection portion 32 and the inflator inlet 33 are also folded in the same direction (from the sheet face toward the viewer) along the folding line. As the inflator connection portion 32 is folded in a direction indicated by an arrow, the fourth guide marks 34, 34, . . . at one of the longitudinal sides of the inflator connection portion 32 are superimposed on the fourth guide marks 34, 34, . . . on the right panel 31R to sew together. Thus, fourth stitch portions 341, 341, . . . are formed, which are indicated by solid diamond shapes, by sewing the fourth guide marks 34, 34, . . . of the inflator connection portion 32 and the right panel 31R. The inflator connection portion 32 is then sewn [up] *in* the areas 321, 321 of the shorter [front] *second* end. Therefore, in a side view of the rear fabric panel 30, the inflator inlet 33 is arranged in a semicircular shape at a bottom of the rear fabric panel 30 and is opened toward outside of the rear fabric panel 30.

Finally, another processing will be described to sew the two front fabric panels 10, 20 and the rear fabric panel 30. FIG. 5 is a schematic perspective view showing the right rear portion 31R sewn to the front fabric panel 10. The front fabric panel 10 and the front fabric panel 20 are inserted from the tether [portion] *portions* 11 into the inwardly folded rear fabric panel 30, while the second stitch portions 151, 151, . . . keep the front fabric panel 10 and the front fabric panel 20 [to be sewn] *together*. The first guide marks 14, 14, . . . along one side of the tether portion 11 projecting from the front fabric panel 10 are superimposed on the first guide marks 14, 14, . . . printed on the inner face of the right rear portion 31R, to sew up together. Thus, first stitch portions 141, 141, . . . are formed, which are indicated by solid circles, by sewing the first guide marks 14, 14, . . . of the tether portion 11 and the right panel 31R. Therefore, it is possible for the first stitch portions 141, 141, . . . to prevent the front fabric panel 10 from moving away from the right panel 31R beyond a predetermined width.

Next, the front fabric panel 10 is folded to conform [the] *its* own arc-shaped peripheral portion 133 to the arc-shaped peripheral portion 133*a* of the right rear portion 31R. The third guide marks 16, 16, . . . of the front fabric panel 10 are then superimposed on the third guide marks 16, 16, . . . of the right rear portion 31R, to sew up together. Thus, third stitch portions (peripheral stitch portions) 161, 161, . . . are formed, which are indicated by solid triangles, by sewing the third guide marks 16, 16, . . . of the front fabric panel 10 and the right panel 31R. In the similar manner, the first guide marks 14, 14, . . . of the front fabric panel 20 are superimposed on the first guide marks 14, 14, . . . of the left rear portion 31L, to sew up together. Thus, other first stitch portions 141, 141, . . . (not shown) are formed by sewing the first guide marks 14, 14, . . . of the front fabric panel 20 and the left rear portion 31L. Further, the third guide marks 16, 16, . . . printed on the front fabric panel 20 are then superimposed on the third guide marks 16, 16, . . . printed on the left rear portion 31L, to sew up together. Thus, other third stitch portions 161, 161, . . . (not shown) are formed by sewing the third guide marks 16, 16, . . . of the front fabric panel 20 and the left panel 31L. It should be noted that, *in* this embodiment, *it* is explained that the tether [portion] *portions* 11 [is] *are* sewn to the right rear portion 31R or the left rear portion 31L by forming the first stitch portions 141, 141 . . . before sewing the front fabric panel 10 and the right rear portion 31R or the front fabric panel 20 and the left rear portion 31L by forming the third stitch portions (peripheral stitch [portion] *portions*) 161, 161, . . . , for illustration. Thus, the airbag cushion may be manufactured by reverse processing. In other words, after sewing the front fabric panel 10 and the right rear portion 31R or the front fabric panel 20 and the left rear portion 31L by forming the third stitch portions (peripheral stitch [portion] *portions*) 161, 161, . . . , the tether [portion] *portions* 11 may be sewn to the right rear portion 31R or the left rear portion 31L by forming the first stitch portions 141, 141 . . . , and then the inflator connection portion 32 may be sewn to *the left rear portion 31L and the right rear portion 31R to form* the fourth stitch portions 341, 341, . . . . In short, the sequence of the sewing process may be modified as desired, according to the manufacturing condition.

Figure 7:
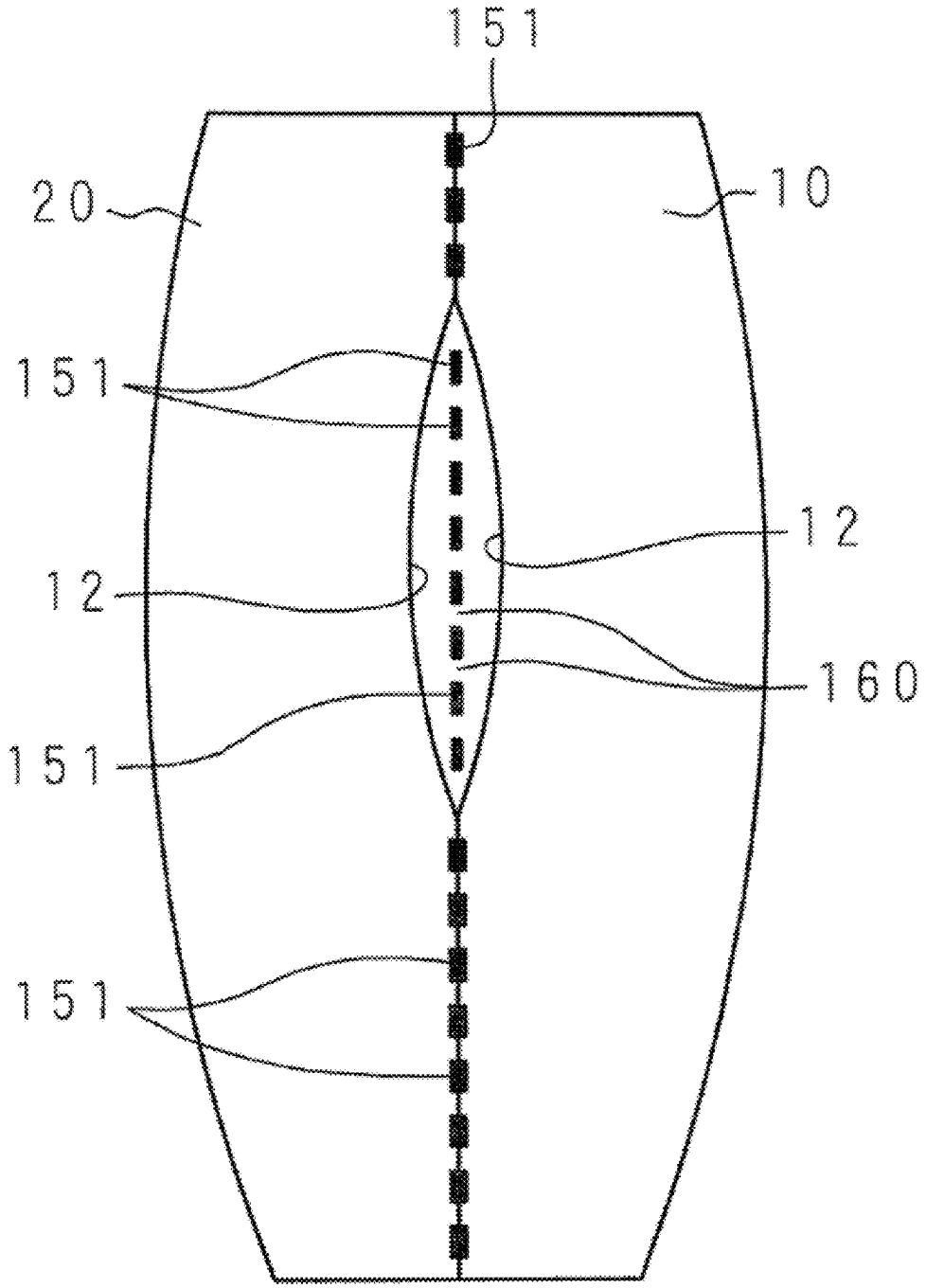
FIG. 7 is a schematic front view showing the airbag cushion inflated and deployed.

FIG. 6 is a schematic side view showing the airbag cushion equipped in the instrumental panel on an assistant driver side, in a deployed state; FIG. 7 is a schematic front view showing the airbag cushion in the deployed state; and FIG. 8 is a schematic cross-sectional view taken along a line VIII-VIII in FIG. 6. The airbag cushion, which is manufactured through the sewing processing described above, is folded in a predetermined shape and stored in an airbag cushion case 2. A gas supply pipe (not shown) of an inflator 3 is inserted [to] *into* the inflator inlet 33 shown in FIG. 5. The inflator 3 and the airbag cushion case 2 are equipped inside the instrumental panel 1 on the assistant driver side. In the case of inflating and deploying the airbag cushion because of collision or the like, the gas is supplied through the gas supply pipe (not shown) of the inflator 3, and then the supplied gas is injected into the airbag cushion through the inflator inlet 33. It should be noted that the inflator inlet 33 and the inflator connection portion 32 are not shown in FIG. 6 for abbreviation.

The airbag cushion is inflated and deployed along the instrumental panel 1 and a front glass 4. The injected gas is loaded into a space defined by [three] stitch portions on the right rear portion 31R [and] *and/or* the front fabric panel 10: the second stitch portions 151, 151, . . . formed to make *the front fabric panel 10 in* a recessed shape, the first stitch portions 141, 141, . . . *formed to prevent the front fabric panel 10 from moving away from the right rear portion 31R beyond a predetermined width, the third stitch portions 161, 161* . . . formed [in] *to join* the [arc-shapes] *arc-shaped peripheral portion 133a of the right rear portion 31R to the arc-shaped peripheral portion 133 of the front fabric panel 10*, and the fourth stitch portions 341, 341, . . . *formed to join the inflator connection portion 32 to the right rear portion 31R*. In the similar manner, the injected gas is loaded into a space defined by [three] stitch portions on the left rear portion 31L [and] *and/or* the front fabric panel 20: the second stitch portions 151, 151, . . . formed to make *the front panel 20* a recessed shape, the first stitch portions 141, 141, . . . *formed to prevent the front fabric panel 20 from moving away from the left rear portion 31L beyond a predetermined width, the third stitch portions 161, 161* . . . formed [in] *to join* the arc-[shapes]*shaped peripheral portion 133a of the left rear portion 31L to the arc-shaped peripheral portion 133 of the front fabric panel 20*, and the fourth stitch portions 341, 341, . . . *formed to join the inflator connection portion 32 to the left rear portion 31L*.

Accordingly, as shown in FIG. 7, the airbag cushion is inflated and deployed [with symmetry of the pattern] *in a symmetric shape*, while directing the front fabric panel 10 and the front fabric panel 20 toward the occupant. Since the front fabric panel 10 and the front fabric panel 20 are sewn together via the second stitch portions 151, 151, . . . , [the airbag cushion is prevented] the front fabric panel 10 *is prevented* from moving away from the front fabric panel 20. In addition, the second stitch portions 151, 151, . . . are formed to make *the front fabric panels 10, 20 in* a recessed shape [in side view]. Accordingly, a recessed [bag] *portion of the airbag* is formed [with] *by* the intermediate portions 12, 12, while [having] the [back end] *first ends* 160 of the tether [portion] *portions* 11 [as the end face] *form the bottom of the recessed portion*. At the moment of inflation/deployment, the front fabric panel 10 and the front fabric panel 20 contact the shoulders or the costae of the occupant to absorb the impact. Moreover, the recessed bag catches the head or the chest to absorb the impact properly. The tether [portion] *portions* 11 [configures a part] *are parts* of the front fabric [panel] *panels* 10, *20*. In other words, *one of* the tether [portion] *portions* 11 is a part of the front fabric panel 10, *and the other one of the tether portions 11 is a part of the front fabric panel 20. In this regard, a first continuous fabric member may define the front fabric panel 10 and one of the tether portions 11, and a second continuous fabric member may define the front fabric panel 20 and the other one of the tether portions 11.* Therefore, it is possible to manufacture the airbag cushion through a simplified processing, because of sewing the [front end] *second ends* of the tether [portion] *portions* 11 to the rear fabric panel.

While the tether portions 11, 11 project from the front fabric panel 10 and the front fabric panel 20 away from the third stitch portions 161, 161, . . . , [each] one side ([front]*second* end) of *each of* the tether portions 11, 11 is sewn at first stitch portions 141, 141, . . . on an inner face of (*or disposed on*) the left rear portion 31L or on an inner face of (*or disposed on*) the right rear portion 31R *that is different than and opposes the inner face of the left rear portion 31L*, as shown in FIGS. 6 and 8. Accordingly, it is possible to limit a spacing between the front fabric panel 10 and the right rear portion 31R, as well as a spacing between the front fabric panel 20 and the left rear portion 31L, within bounds corresponding to a [spacing] *distance* between the one side ([front]*second* end) of *each of* the tether [portion] *portions* 11 [defined by] *that is sewn at* the first stitch portions 141, 141, . . . and the [back] *first* end 160 on the other side of *each of* the tether [portion] *portions* 11 [defined by] *that is sewn at* the second stitch portions 151, 151, . . . , at the moment of the inflation/deployment of the airbag cushion.

It should be noted that, *in* this embodiment, *it* is explained to equip the airbag cushion inside the instrumental panel 1 on the assistant driver side, for illustration. For example, the airbag cushion may be equipped inside a steering wheel on a driver side, a back side of a front seat to protect an occupant on a rear seat, or a handle component of a motorcycle. Furthermore, it should be noted that this embodiment is explained to manufacture the airbag cushion with the rear fabric panel 30, the front fabric panel 10, the front fabric panel 20 and two tether portions 11, 11, for illustration. An additional fabric panel may be utilized to manufacture the airbag cushion as appropriate.

Second Embodiment

The first embodiment is explained to have the tether [portion] *portions* 11 that [is] *are* a part of the front fabric [panel] *panels* 10, *20*. However, the tether [portion] *portions* 11 may be a separate structure from the front fabric [panel] *panels* 10, *20*. [FIG.] *FIGS.* 9 [is a] *and 10 are* plan [view] *views* showing a shape of [the] front fabric [panel] *panels* 10*a*, *20a* and [the] tether [portion] *portions* 11*a* according to a second embodiment. The front fabric [panel] *panels* 10*a*, *20a* of the second embodiment [is] *are* shorter than the front fabric [panel] *panels* 10, *20* of the first embodiment by a size corresponding to the tether [portion] *portions* 11*a*, because the tether [portion] *portions* 11*a* of the second embodiment [is a] *are* separate [structure] *structures* from the front fabric [panel] *panels* 10*a*, *20a*. The tether [portion] *portions* 11*a* [is] *are* formed in a rectangular shape, and made of the same material as that of the front fabric [panel] *panels* 10*a*, *20a* or a composite material containing an elastic material such as a polyurethane fiber. On *one of* the tether [portion] *portions* 11*a*, the front fabric panel 10*a* is placed to arrange the [back] *first* end 160 of the tether portion 11*a* under the second guide marks 15 of the front fabric panel 10*a*. A configuration for the front fabric panel 20*a* is similar to the configuration for the front fabric panel 10*a* and, accordingly, will not be described in detail.

FIG. 10 is a plan view showing a state where the front fabric panel 10*a* and *one of* the tether [portion] *portions* 11*a*, as well as the front fabric panel 20*a* and *the other one of* the tether [portion] *portions* 11*a*, are sewn up together. The tether portions 11*a*, 11*a* are inserted into a space between the front fabric panel 10*a* and the front fabric panel 20*a*. Thus, each tether portion 11*a* partially overlaps the front fabric panel 10*a* or the front fabric panel 20*a*. The [back] *first* ends 160, 160 of the tether portions 11*a*, 11*a* are sewn to the front fabric panels 10*a*, 20*a* along the second guide marks 15, 15, . . . , after confirming that the [back] *first* ends 160, 160 of the tether portions 11*a*, 11*a* are located between the second guide [mark] *marks* 15 of the front fabric panel 10*a* and the second guide [mark] *marks* 15 of the front fabric panel 20*a*. Thus, the second stitch portions (recessed stitch [portion] *portions*) 151, 151, . . . are formed [to make a recessed shape], which are indicated by solid triangles, by sewing the [back] *first* ends 160, 160 of the tether portions 11*a*, 11*a* and the front fabric panels 10*a*, 20*a* *together to make a recessed shape. In addition, the tether portions 11a, 11a may be joined to one another at an intersection between the front fabric panels 10a, 20a and the tether portions 11a, 11a, and the tether portions 11a, 11a may be joined directly to the front fabric panels 10a, 20a.* It should be noted that this embodiment is explained to have the tether [portion] *portions* 11*a* which [is] *are* vertically long with a rectangular shape, for illustration. The tether [portion] *portions* 11*a* may be horizontally long with a rectangular shape. It is possible to improve design flexibility for the tether [portion] *portions* 11*a* which [is] *are* configured to be [a] separate [structure] *structures* from the front fabric [panel] *panels* 10*a*, *20a*. For example, it is possible to modify the material of the tether [portion] *portions* 11*a* to an elastic material, as appropriate. Furthermore, it is possible to simplify the processing to manufacture the airbag cushion, [for] *by* sewing together the [back] *first* ends 160, 160 of the tether portions 11*a*, the front fabric panel 10*a* and the front fabric panel 20*a* along the second stitch portions 151, 151, . . . at [a] *the same* time.

Some configurations and advantages of the second embodiment are described above. Other configurations that are the same as those of the first embodiment are given the identical numerals to the first embodiment and, accordingly, those other configurations and other advantages will not described in detail.

Third Embodiment

According to a third embodiment, the [back end portion] *first ends* 160 of the tether [portion] *portions* 11*a* may be sewn separately from the second stitch portions 151. FIG. 11 is a plan view showing a shape of the front fabric panel 10*a* and the tether [portion] *portions* 11*a* according to the third embodiment. The front fabric panel 10*a* and the tether [portion] *portions* 11*a* of the third embodiment are formed in the same shapes as those of the second embodiment. The tether [portion] *portions* 11*a* of the third embodiment [is] *are* further made of the same material as that of the second embodiment. On *one of* the tether [portion] *portions* 11*a*, the front fabric panel 10*a* is placed to arrange the [back] *first* end 160 of the tether portion 11*a* between a [front] *second* end of the front fabric panel 10*a* and the second guide marks 15, 15, . . . of the front fabric panel 10*a*. It should be noted that the tether portion 11*a* may be placed on the front fabric panel 10*a*.

The [back] *first* end 160 of the tether portion 11*a* is then sewn to a portion between the [front] *second* end of the front fabric panel 10*a* and the second guide marks 15, 15, . . . . Thus, fifth stitch portions 111, 111, . . . are formed by sewing the [back] *first* end 160 and the front fabric panel 10*a*. Therefore, it is possible to join the [back] *first* end 160 of the tether portion 11*a* to the front fabric panel 10*a* which is a separate structure from the tether portion 11*a*. The front fabric panel 10*a* and the front fabric panel 20*a* are then sewn together, as shown with FIG. 3 in the first embodiment, to form second stitch portions (recessed stitch [portion] *portions*) 151, 151, . . . to make a recessed shape. In this configuration, the tether [portion] *portions* 11*a* [projects] *project* from a vicinity of the second stitch portions 151, 151, . . . . A configuration for the front fabric panel 20*a* is similar to the configuration for the front fabric panel 10*a* and, accordingly, will not be described in detail.

Some configurations and advantages of the third embodiment are described above. Other configurations that are the same as those of the first and second embodiments are given the identical numerals to the first and second embodiments and, accordingly, those other configurations and other advantages will not described in detail.

Fourth Embodiment

Figure 12:
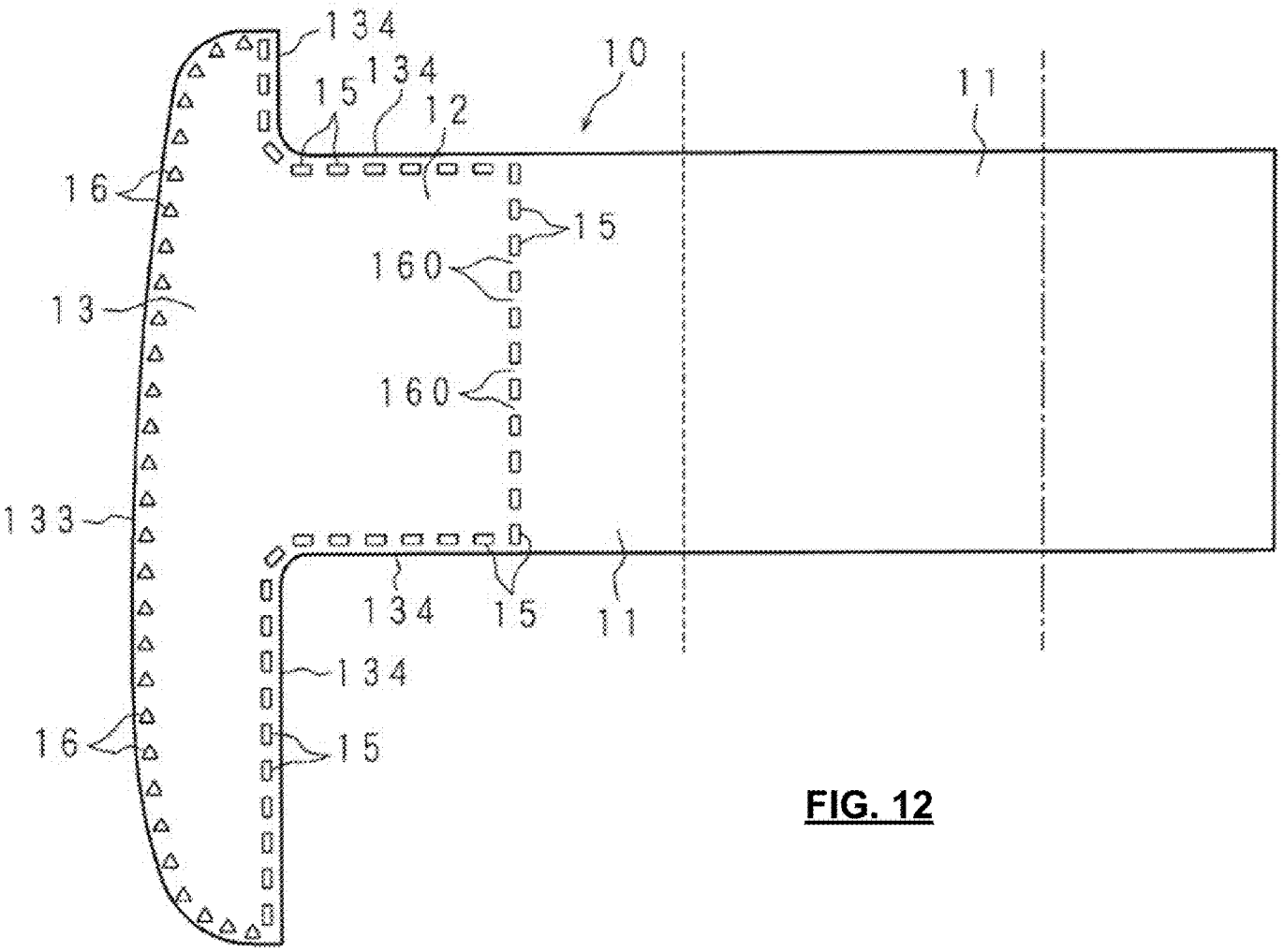
FIG. 12 is a plan view showing a shape of a front fabric panel *according to a fourth embodiment*.

According to a fourth embodiment, *some portions of* the front fabric [panel] *panels* 10, 20 may be cut [some portions], in accordance with a design. FIG. 12 is a plan view showing a shape of a front fabric panel. The *tether portion 11 protruding from* front fabric panel 10 of the fourth embodiment [protrudes] *is* longer *than the* tether portion 11 [than that] of the first embodiment. The tether portion 11 is a rectangular shape that [projecting direction] is longer *in the projecting direction*. In accordance with a design *parameter*, such as a size, an inflation tolerance, an equipped position of the airbag and the like, the tether portion 11 is cut from a direction crossing [to] the projecting direction.

The tether portion 11 may be cut from a direction crossing [to] the projecting direction, for example, at a position indicated by *the* dash line or *the* alternate long and short dash line in FIG. 12. If the tether portion 11 needs to be [longer] *shorter*, it is cut from a direction crossing [to] the projecting direction, at a position indicated by *the* dash line [near] *nearer* the head portion 13. If the tether portion 11 needs to be [shorter] *longer*, it is cut from a direction crossing [to] the projecting direction, at a position indicated by *the* alternate long and short dash line [away] *further* from the head portion 13. The front fabric panel 20 also has the tether portion 11 cut at a position to [lead] *leave* the same length as the tether portion 11 of the front fabric panel 10, although it is not shown. If the tether [portion] *portions* 11 [needs] *need* to be further longer, each *of* the front fabric [panel] *panels* 10, 20 [protruding] *from which* the tether [portion] *portions* 11 *protrude* is utilized without cutting. These configurations allow making each *of* the front fabric panels 10, 20 *to* have the tether [portion] *portions* with suitable length in accordance with a design.

Figure 13:
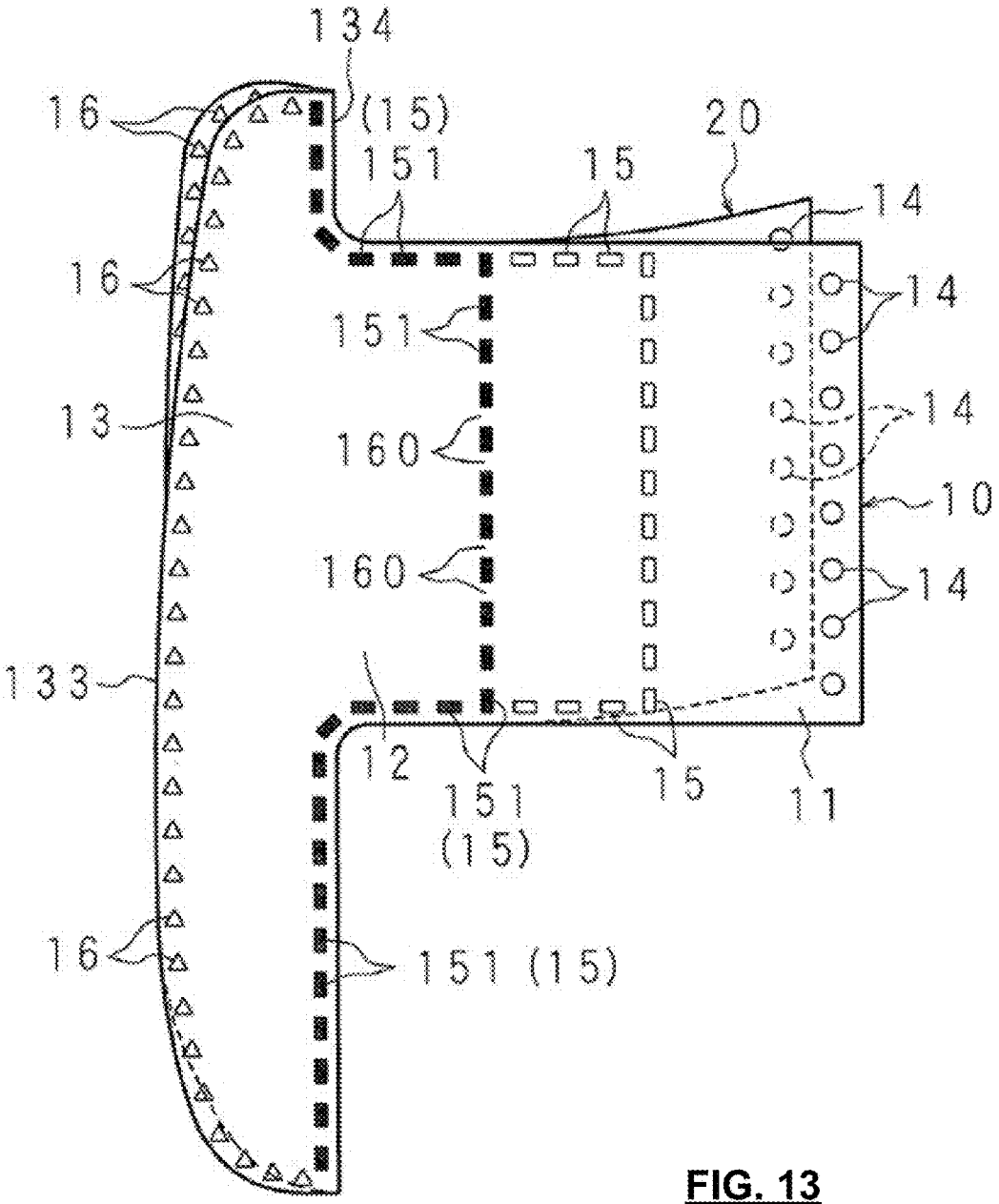
FIG. 13 is a plan view showing a state where two front fabric panels are sewn together.

In addition, a shape of the recessed stitch portion 151 may be changed in accordance with a design. FIG. 13 is a plan view showing a state where two front fabric panels 10, 20 are sewn together. A depth of the recessed portion of the recessed stitch portion 151 also may be changed in accordance with a design. If the tether [portion] *portions* 11 [needs] *need* to be longer, the recessed stitch portion 151 may be sewn, for example, to have a shallower depth. On the other hand, if the tether [portion] *portions* 11 [needs] *need* to be shorter, the recessed stitch portion 151 may be sewn, for example, to have a deeper depth.

FIG. 13 is an illustration for the recessed stitch portion 151 having a shallower depth. If the tether [portion] *portions* 11 [needs] *need* to be longer, the front fabric panel 10 may be sewn to the front fabric panel 20 at a position for shallower depth of the recessed portion, i.e. at a position [near] *nearer* the head [portion] *portions* 13, to form a second stitch portion (recessed stitch [portion] *portions*) 151 indicated by solid rectangle shapes. On the other hand, if the tether [portion] *portions* 11 needs to be shorter, the front fabric panel 10 may be sewn to the front fabric panel 20 at a position [away] *further* from the head [portion] *portions* 13 for deeper depth of the recessed portion, i.e. at the second guide marks 15 indicated *by* void rectangular shapes in FIG. 13. These configurations allow making each the front fabric panels 10, 20 have the tether [portion] *portions* with suitable length in accordance with a design.

Some configurations and advantages of the forth embodiment are described above. Other configurations that are the same as those of the first, second and third embodiments are given the identical numerals to the first, second and third embodiments and, accordingly, those other configurations and other advantages will not described in detail.

Fifth Embodiment

According to a fifth embodiment, the airbag has one front fabric panel 10*b*. FIG. 14 is a plan view showing a shape of a front fabric panel according to the fifth embodiment. The front fabric panel 10*b* includes two head portions 13, 13 and two intermediate portions 12, 12 joining respectively to the two head portions 13, 13. The front fabric panel 10*b* is a symmetrical shape relative to a substantial center in the longitudinal direction indicated by *the* alternate long and short dash line. The intermediate [portion] *portions* 12 [is] *are* joined to the head [portion] *portions* 13, at *an* upper position [than] *relative to* a center position of the substantial semi-elliptic-shaped head [portion] *portions* 13. A periphery of the head [portion] *portions* 13 joined to the intermediate [portion] *portions* 12 includes the arc-shaped peripheral portions 133, 133, . . . that are sewn to a periphery of the rear fabric panel and the substantial L-shaped peripheral portions 134, 134, . . . that are sewn together after folding the front fabric panel 10*b* along a position *or fold line* indicated by *the* alternate long and short dash line.

The [front panel 10 is printed the] second guide marks 15, 15, . . . indicated by [alternate long and short dash line] *void rectangle shapes*, *are printed* at some portions *of the front panel 10b*. The second guide marks 15, 15, . . . are used to sew after superimposing each *of* the head portions 13, 13 and each *of* the intermediate portions 12, 12 in a proper alignment by folding. For example, the second guide marks 15, 15, . . . are printed along the periphery of the front fabric panel 10*b*, as shown by *the* void rectangle shapes. The second guide marks 15, 15, . . . are printed at the intermediate portion 12 of the front fabric panel 10*b*, in a vertical direction crossing [to] the longitudinal direction of the front fabric panel 10*b*, too. To adjust the depth of the recessed portion, [the front panel 10 may be printed] plural lines of the second guide marks 15, 15, . . . extending in the vertical direction crossing [to] the longitudinal direction *may be printed on the front panel 10b*. It should be noted that this embodiment is explained to have two lines of the second guide marks 15, 15, . . . extending in the vertical direction crossing [to] the longitudinal direction, for illustration. *Each of the two lines of the second guide marks 15, 15, . . . extending in the vertical direction are substantially parallel to and spaced apart from the fold line indicated by the alternate long and short dash line.*

If the recessed depth should be shallower, the front fabric panel 10*b* may be sewn along the second guide marks 15 [near] *nearer* the head [portion] *portions* 13 to form the recessed shape. On the other hand, if the recessed depth should be deeper, the front fabric panel 10*b* may be sewn along the second guide marks 15 [away] *further* from the head [portion] *portions* 13, near the center, to form the recessed shape. [Along] *Printed along* the arc-shaped peripheral [portion] *portions* 133 of the head [portion] *portions* 13[,] *of* the front fabric panel [10 is printed] *10b are* the third guide marks 16, 16, . . . [that], *which* are indicated by void triangle shapes. The third guide marks 16, 16, . . . are used to sew the rear fabric panel 30 and the arc-shaped peripheral portions 133, 133 of the front fabric panel 10*b* in a proper alignment.

FIG. 15 is a plan view showing a state where the front fabric panel *10b* is sewn. The front fabric panel 10*b* is folded along the alternate long and short dash line. Respective head portions 13, 13, as well as respective intermediate portions 12, 12, are properly superimposed. Then, the front fabric panel 10*b* is sewn along one of the lines of the second guide [mark] *marks* 15 to form a second stitch [portion] *portions* (recessed stitch [portion] *portions*) 151 *and thereby form the front fabric panel 10b* in a recessed shape. In FIG. 15, the front fabric panel 10*b* is sewn along the second guide [mark] *marks* 15 positioned [away] *further* from the head [portion] *portions* 13, to make the recessed depth deeper.

FIG. 16 is a plan view showing a state where the front fabric panel *10b* and the tether [portion] *portions* 11*a* are sewn together. The [back end] *first ends* 160 of the tether [portion] *portions* 11*a* [is] *are* sewn to a portion of the front panel 10*b* [for folding]. This embodiment is explained to have the tether [portion] *portions* 11*a* that is configured from two rectangular tether portions 11*a*, 11*a*, for illustration. It should be noted that one rectangular tether portion may be utilized, for example, [to fold] *by folding along* the substantial center *of the one rectangular tether portion in the same manner as the front fabric panel 10b,* and [to be sewn] *sewing* the folded portion [as the back end 160] *of the one rectangular tether portion* to a portion of the front fabric panel [10, in the same manner] *10b just* as *the first ends 160 are sewn to* the front fabric panel 10*b*.

One [back] *first* end 160 of the tether [portion] *portions* 11*a* is put on the one surface of the front fabric panel 10*b*, and the other [back] *first* end 160 of the tether [portion] *portions* 11*a* is put on the reverse surface of the front fabric panel 10*b*. Firstly, the one [back] *first* end 160 of the tether [portion] *portions* 11*a* is then sewn. Secondly, the one surface and reverse surface of the front fabric are sewn. Finally, the other [back] *first* end 160 of the tether [portion] *portions* 11*a* is sewn. Therefore, [it is configured] a sewn component *is made* from the front fabric panel 10*b* and the tether [portion] *portions* 11*a*. How to sew the sewn component to the rear panel 30 is in the same manner as that of the first embodiment and, accordingly, will not have been described in detail.

Some configurations and advantages of the fifth embodiment are described above. Other configurations that are the same as those of the first, second, third and [forth] *fourth* embodiments are given the identical numerals to the first, second, third and [forth] *fourth* embodiments and, accordingly, those other configurations and other advantages will not described in detail. The embodiments of the manufacturing method of airbag cushion and the airbag cushion described herein are only preferred illustrations of the present invention. Thus, various modifications may be made thereto. Unless otherwise specified to have restrictions in the description, the present invention is not limited and restricted by the shape, the size, the arrangement and the like of the figures. In addition, phrases and terms in the description are utilized for illustration. Thus, unless otherwise specified to have restrictions in the description, the present invention is not limited and restricted by the phrases and terms.

As this invention may be embodied in several forms wihout departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A [manufacturing] method of *manufacturing* an airbag cushion, comprising *the* steps of:

superimposing a first front fabric panel of the airbag cushion on a second front fabric panel of the airbag cushion, wherein [the first front fabric panel protrudes] a first tether portion *protrudes from the first front fabric panel* and [the second front fabric panel protrudes] a second tether portion *protrudes from the second front fabric panel*;

sewing a part of a periphery of the superimposed first and second front fabric panels;

sewing a [back] *first* end of the first tether portion [and] *directly to* a [back] *first* end of the second tether portion [together];

sewing a [front] *second* end of the first tether portion to [an] *a first* inner face of a rear fabric panel of the airbag cushion;

sewing a [front] *second* end of the second tether portion to [an] *a second* inner face of the rear fabric panel;

sewing *a part of* a periphery of the rear fabric panel to *a part of* a periphery of the first front fabric panel; and sewing *a part of* a periphery of the rear fabric panel to *a part of* a periphery of the second front fabric panel.

2. A [manufacturing] method of *manufacturing* an airbag cushion according to claim 1, further comprising *the* steps of:

sewing a part of the first front fabric panel to the [back] *first* end of the first tether portion; and sewing a part of the second front fabric panel to the [back] *first* end of the second tether portion.

3. A [manufacturing] method of *manufacturing* an airbag cushion according to claim 1, further comprising a step of:

superimposing the [back] *first* end of the first tether portion, the [back] *first* end of the second tether portion, and [a part] *portions* of the superimposed first and second front fabric panels.

4. A [manufacturing] method of *manufacturing* an airbag cushion according to claim 1, wherein*:* the first tether portion [is a part of] *and* the first front fabric panel *are defined by a first continuous fabric member*; and the second tether portion [is a part of] *and* the second front fabric panel *are defined by a second continuous fabric member*.

5. A [manufacturing] method of *manufacturing* an airbag cushion according to claim 1, further comprising *the* steps of:

cutting an end of the first front fabric panel; and cutting an end of the second front fabric panel.

6. A [manufacturing] method of *manufacturing* an airbag cushion according to claim 1, further comprising a step of:

[adjusting] *setting* a depth of a recessed portion formed by sewing the [back] *first* end of the first tether portion, the [back] *first* end of the second tether portion, and the part of a periphery of the superimposed first and second front fabric panels.

7. An airbag cushion, comprising:

a first front fabric panel *portion*;

a second front fabric panel *portion*;

a rear fabric panel;

a recessed stitch portion where the first front fabric panel *portion* is sewn to the second front fabric panel *portion*;

a *first* peripheral stitch portion where *a part of* a periphery of the first front fabric panel[, a periphery of the second front fabric panel,] *portion* and *a part of* a periphery of the rear fabric panel are sewn;

*a second peripheral stitch portion where a part of a periphery of the second front fabric panel portion and a part of a periphery of the rear fabric panel are sewn;* a first tether portion that joins the recessed stitch portion to [an] *a first* inner face of the rear fabric panel; and a second tether portion that joins the recessed stitch portion to [an] *a second* inner face of the rear fabric panel *that is different than the first inner face, wherein the first and second inner faces of the rear fabric panel oppose one another.*

8. An airbag cushion according to claim 7, wherein*:* the first front fabric panel *portion* and the second front fabric panel *portion* are parts of one front fabric panel; and the [recessed stitch portion is] *first and second front fabric panel portions are* formed by folding the one front fabric panel *along a fold line.*

9. An airbag cushion according to claim 7, wherein the recessed stitch portion is formed [in a recessed shape] by sewing *a part of a periphery of the first front fabric panel portion to a part of a periphery of the second front fabric panel portion.*

10. An airbag cushion according to claim 7, wherein*:* a [front] *second* end of the first tether portion is sewn to the *first* inner face of the rear fabric panel and a [back] *first* end of the first tether portion is sewn to the first front fabric panel *portion*; and a [front] *second* end of the second tether portion is sewn to the *second* inner face of the rear fabric panel and a [back] *first* end of the second tether portion is sewn to the second front fabric panel *portion*.

11. An airbag cushion according to claim 7, wherein*:* the first tether portion [is a part of] *and* the first front fabric panel *portion are defined by a first continuous fabric member,* and *the first tether portion* projects from the recessed stitch portion;

the second tether portion [is a part of] *and* the second front fabric panel *portion are defined by a second continuous fabric member,* and *the second tether portion* projects from the recessed stitch portion; and the recessed stitch portion is positioned at a [back] *first* end of the first tether portion and at a [back] *first* end of the second tether portion.

12. An airbag cushion according to claim 7, wherein*:* the first tether portion is a separate structure from the first front fabric panel *portion* and [arranged to project] *projects* from the recessed stitch portion; and the second tether portion is a separate structure from the second front fabric panel *portion* and [arranged to project] *projects* from the recessed stitch portion.

13. An airbag cushion according to claim 7, wherein*:* the first tether portion is a separate structure from the first front fabric panel *portion* and [arranged to project] *projects* from a vicinity of the recessed stitch portion; and the second tether portion is a separate structure from the second front fabric panel *portion* and [arranged to project] *projects* from a vicinity of the recessed stitch portion.

14. An airbag cushion according to claim 7, wherein the recessed stitch portion is [sewn] *formed by sewing* on a [back] *first* end of the first tether portion, on a [back] *first* end of the second tether portion, on a [part of] periphery of the first front fabric panel *portion* with [a] *an* exception of the *first* peripheral stitch portion, and on a [part of] periphery of the second front fabric panel *portion* with [a] *an* exception of the *second* peripheral stitch portion.

15. An airbag cushion according to claim 8, wherein the recessed stitch portion is [sewn on a back end of the first tether portion, on a back end of the second tether portion,] *formed by sewing* on a [part of] periphery of the first front fabric panel *portion* with [a] *an* exception of the *first* peripheral stitch portion[,] and on a [part of] periphery of the second front fabric panel *portion* with [a] *an* exception of the *second* peripheral stitch portion.

16. An airbag cushion according to claim 9, wherein the recessed stitch portion is [sewn] *formed by sewing* on a [back] *first* end of the first tether portion, on a [back] *first* end of the second tether portion, on a [part of] periphery of the first front fabric panel *portion* with [a] *an* exception of the *first* peripheral stitch portion, and on a [part of] periphery of the second front fabric panel *portion* with [a] *an* exception of the *second* peripheral stitch portion.

17. An airbag cushion according to claim 10, wherein the recessed stitch portion is [sewn] *formed by sewing* on a [back] *first* end of the first tether portion, on a [back] *first* end of the second tether portion, on a [part of] periphery of the first front fabric panel *portion* with [a] *an* exception of the *first* peripheral stitch portion, and on a [part of] periphery of the second front fabric panel *portion* with [a] *an* exception of the *second* peripheral stitch portion.

18. An airbag cushion according to claim 11, wherein the recessed stitch portion is [sewn] *formed by sewing* on a [back] *first* end of the first tether portion, on a [back] *first* end of the second tether portion, on a [part of] periphery of the first front fabric panel *portion* with [a] *an* exception of the *first* peripheral stitch portion, and on a [part of] periphery of the second front fabric panel *portion* with [a] *an* exception of the *second* peripheral stitch portion.

19. An airbag cushion according to claim 12, wherein the recessed stitch portion is [sewn] *formed by sewing* on a [back] *first* end of the first tether portion, on a [back] *first* end of the second tether portion, on a [part of] periphery of the first front fabric panel *portion* with [a] *an* exception of the *first* peripheral stitch portion, and on a [part of] periphery of the second front fabric panel *portion* with [a] *an* exception of the *second* peripheral stitch portion.

20. An airbag cushion according to claim 13, wherein the recessed stitch portion is [sewn] *formed by sewing* on [a back end of the first tether portion, on a back end of the second tether portion, on] a [part of] periphery of the first front fabric panel *portion* with [a] *an* exception of the *first* peripheral stitch portion[,] and on a [part of] periphery of the second front fabric panel *portion* with [a] *an* exception of the *second* peripheral stitch portion.

*21. An airbag cushion according to claim 7, wherein:*

*the first front fabric panel portion and the first tether portion are defined by a first continuous fabric member;*

*the second front fabric panel portion and the second tether portion are defined by a second continuous fabric member; and*

*the first continuous fabric member is sewn to the second continuous fabric member at locations where the first and second front fabric panel portions intersect the first and second tether portions, respectively, to form the recessed stitch portion.*

*22. An airbag cushion according to claim 7, wherein:*

*the first tether portion has a first end that is joined to the first front fabric panel portion and a second end that is sewn to the first inner face of the rear fabric panel;*

*the second tether portion has a first end that is joined to the second front fabric panel portion and a second end that is sewn to the second inner face of the rear fabric panel; and*

*the first end of the first tether portion is sewn directly to the first end of the second tether portion.*

*23. An airbag cushion according to claim 8, wherein the recessed stitch portion is formed by stitching along guide marks on the first and second front fabric panel portions that are substantially parallel to and spaced apart from the fold line.*

*24. An airbag cushion comprising:*

*a rear fabric panel and at least one front fabric panel sewn together, the rear fabric panel including a left lateral side, a right lateral side, and a rear side, the left and right lateral sides extending from the rear side toward the at least one front fabric panel;*

*a peripheral stitch portion where a part of a periphery of the rear fabric panel and a part of a periphery of the at least one front fabric panel corresponding to the part of the periphery of the rear fabric panel are sewn; and*

*two tether portions that project from the at least one front fabric panel and are sewn to the rear fabric panel, wherein:*

*the two tether portions each include a first end that is joined to the at least one front fabric panel and a second end that is stitched to the rear fabric panel;*

*the second end of one of the tether portions is sewn to an inner face of the right lateral side of the rear fabric panel, and the second end of the other one of the tether portions is sewn to an inner face of the left lateral side of the rear fabric panel; and*

*the first end of one of the tether portions is sewn directly to the first end of the other one of the tether portions.*

*25. An airbag cushion according to claim 24, wherein*

*the second end of the one of the tether portions is sewn to a substantial midpoint of the inner face of the right lateral side of the rear fabric panel in an orthogonal direction to a folding line between the left and right lateral sides of the rear fabric panel, and the second end of the other one of the tether portions is sewn to a substantial midpoint of the inner face of the left lateral side of the rear fabric panel in an orthogonal direction to the folding line.*

*26. An airbag cushion according to claim 25, wherein a guide mark for sewing is printed at the substantial midpoint of the inner face of the right lateral side of the rear fabric panel to which the one of the tether portions is sewn, and at the substantial midpoint of the inner face of the left lateral side to which the other one of the tether portions is sewn.*

*27. An airbag cushion according to claim 24, wherein the tether portions are separate structures from the at least one front fabric panel.*

*28. An airbag cushion according to claim 27, wherein the tether portions are attached to the at least one front fabric panel via stitching.*

*29. An airbag cushion according to claim 24, wherein the tether portions are formed from the same material as the at least one front fabric panel.*

*30. An airbag cushion according to claim 24, wherein the tether portions are formed from a different material than the at least one front fabric panel.*

*31. An airbag cushion according to claim 24, wherein the two tether portions are joined to one another at an intersection between the at least one front fabric panel and the two tether portions.*

*32. An airbag cushion according to claim 24, wherein the two tether portions are joined directly to the at least one front fabric panel.*

*33. An airbag cushion according to claim 24, wherein a first continuous fabric member defines a first front fabric panel of the at least one front fabric panel and a first tether portion of the two tether portions, and a second continuous fabric member defines a second front fabric panel of the at least one front fabric panel and a second tether portion of the two tether portions.*

*34. An airbag cushion comprising:*

*a rear fabric panel and at least one front fabric panel sewn together, the rear fabric panel including a left lateral side, a right lateral side, and a rear side, the left and right lateral sides extending from the rear side toward the at least one front fabric panel;*

*a peripheral stitch portion where a part of a periphery of the rear fabric panel and a part of a periphery of the at least one front fabric panel corresponding to the part of the periphery of the rear fabric panel are sewn; and*

*two tether portions that project from the at least one front fabric panel and are sewn to the rear fabric panel, wherein:*

*the two tether portions each include a first end that is joined to the at least one front fabric panel and a second end that is stitched to the rear fabric panel;*

*the second end of one of the tether portions is sewn to an inner face of the right lateral side of the rear fabric panel, and the second end of the other one of the tether portions is sewn to an inner face of the left lateral side of the rear fabric panel; and*

*at least one of the tether portions and at least a portion of the at least one front fabric panel are defined by a continuous fabric member.*

*35. A method of manufacturing an airbag cushion, comprising the steps of:*

*superimposing a first front fabric panel of the airbag cushion on a second front fabric panel of the airbag cushion, wherein a first tether portion protrudes from the first front fabric panel and a second tether portion protrudes from the second front fabric panel;*

*sewing a part of a periphery of the superimposed first and second front fabric panels;*

*sewing a first end of the first tether portion to a first end of the second tether portion;*

*sewing a second end of the first tether portion to a first inner face of a rear fabric panel of the airbag cushion;*

*sewing a second end of the second tether portion to a second inner face of the rear fabric panel;*

*sewing a part of a periphery of the rear fabric panel to a part of a periphery of the first front fabric panel; and*

*sewing a part of a periphery of the rear fabric panel to a part of a periphery of the second front fabric panel, wherein:*

*the second inner face of the rear fabric panel is different than the first inner face of the rear fabric panel; and*

*the first and second inner faces oppose one another.*

*36. A method of manufacturing an airbag cushion, comprising the steps of:*

*superimposing a first front fabric panel of the airbag cushion on a second front fabric panel of the airbag cushion, wherein a first tether portion protrudes from the first front fabric panel and a second tether portion protrudes from the second front fabric panel;*

*sewing a part of a periphery of the superimposed first and second front fabric panels;*

*sewing a first end of the first tether portion to a first end of the second tether portion;*

*sewing a second end of the first tether portion to a first inner face of a rear fabric panel of the airbag cushion;*

*sewing a second end of the second tether portion to a second inner face of the rear fabric panel;*

*sewing a part of a periphery of the rear fabric panel to a part of a periphery of the first front fabric panel; and*

*sewing a part of a periphery of the rear fabric panel to a part of a periphery of the second front fabric panel, wherein:*

*the second inner face of the rear fabric panel is different than the first inner face of the rear fabric panel;*

*the rear fabric panel includes a left lateral side, a right lateral side, and a rear side;*

*the left lateral side extends from the rear side toward one of the first and second front fabric panels;*

*the right lateral side extends from the rear side toward the other one of the first and second front fabric panels;*

*the first inner face of the rear fabric panel is disposed on one of the left and right lateral sides of the rear fabric panel; and*

*the second inner face of the rear fabric panel is disposed on the other one of the left and right lateral sides of the rear fabric panel.*

*37. An airbag cushion, comprising:*

*a first front fabric panel portion;*

*a second front fabric panel portion;*

*a rear fabric panel;*

*a recessed stitch portion where the first front fabric panel portion is sewn to the second front fabric panel portion;*

*a first peripheral stitch portion where a part of a periphery of the first front fabric panel portion and a part of a periphery of the rear fabric panel are sewn;*

*a second peripheral stitch portion where a part of a periphery of the second front fabric panel portion and a part of a periphery of the rear fabric panel are sewn;*

*a first tether portion that joins the recessed stitch portion to a first inner face of the rear fabric panel; and*

*a second tether portion that joins the recessed stitch portion to a second inner face of the rear fabric panel that is different than the first inner face, wherein:*

*the rear fabric panel includes a left lateral side, a right lateral side, and a rear side;*

*the left lateral side extends from the rear side toward one of the first and second front fabric panel portions;*

*the right lateral side extends from the rear side toward the other one of the first and second front fabric panel portions;*

*the first inner face of the rear fabric panel is disposed on one of the left and right lateral sides of the rear fabric panel; and*

*the second inner face of the rear fabric panel is disposed on the other one of the left and right lateral sides of the rear fabric panel.*

*38. An airbag cushion comprising:*

*a rear fabric panel and at least one front fabric panel sewn together, the rear fabric panel including a left lateral side, a right lateral side, and a rear side, the left and right lateral sides extending from the rear side toward the at least one front fabric panel;*

*a peripheral stitch portion where a part of a periphery of the rear fabric panel and a part of a periphery of the at least one front fabric panel corresponding to the part of the periphery of the rear fabric panel are sewn; and*

*two tether portions that project from the at least one front fabric panel and are sewn to the rear fabric panel, wherein:*

*the two tether portions each include a first end that is joined to the at least one front fabric panel and a second end that is stitched to the rear fabric panel;*

*the second end of one of the tether portions is sewn to an inner face of the right lateral side of the rear fabric panel, and the second end of the other one of the tether portions is sewn to an inner face of the left lateral side of the rear fabric panel;*

*the rear fabric panel includes a left rear portion, a right rear portion, and an inflator connection portion;*

*the left rear portion and the right rear portion are joined together along a folding line;*

*the inflator connection portion is joined to the left and right rear portions and projects from the left and right rear portions along the folding line; and*

*the inflator connection portion has longitudinal sides that each include at least one of a first side portion that is substantially parallel to the folding line and a second side portion that tapers inward toward the folding line as the inflator connection portion projects from the left and right rear portions.*

*39. An airbag cushion according to claim 38, wherein the longitudinal sides of the inflator connection portion each include both of the first and second side portions.*

*40. An airbag cushion according to claim 38, wherein the left and right rear portions have lower peripheries that are stitched to portions of the longitudinal sides of the inflator connection portion and that are substantially perpendicular to the folding line.*

* * * * *